(12) United States Patent
Kim et al.

(10) Patent No.: US 12,461,667 B2
(45) Date of Patent: Nov. 4, 2025

(54) MULTIPLE CURRENT QUANTIZATION VALUES FOR PEAK POWER MANAGEMENT

(71) Applicant: Micron Technology, Inc., Boise, ID (US)

(72) Inventors: Chulbum Kim, San Jose, CA (US); Jonathan S. Parry, Boise, ID (US); Luca Nubile, Sulmona (IT); Ali Mohammadzadeh, Mountain View, CA (US); Biagio Iorio, L'Aquila (IT); Liang Yu, Boise, ID (US); Jeremy Binfet, Boise, ID (US); Walter Di Francesco, Avezzano (IT); Daniel J. Hubbard, Boise, ID (US); Luigi Pilolli, L'Aquila (IT)

(73) Assignee: Micron Technology, Inc., Boise, ID (US)

( * ) Notice: Subject to any disclaimer, the term of this patent is extended or adjusted under 35 U.S.C. 154(b) by 265 days.

(21) Appl. No.: 18/231,338

(22) Filed: Aug. 8, 2023

(65) Prior Publication Data

US 2024/0061592 A1 Feb. 22, 2024

Related U.S. Application Data

(60) Provisional application No. 63/398,266, filed on Aug. 16, 2022.

(51) Int. Cl.
*G11C 16/04* (2006.01)
*G06F 1/3225* (2019.01)
*G06F 1/3234* (2019.01)
*G06F 3/06* (2006.01)
*G11C 16/30* (2006.01)

(52) U.S. Cl.
CPC .......... *G06F 3/0625* (2013.01); *G06F 1/3225* (2013.01); *G06F 1/3275* (2013.01); *G06F 3/0659* (2013.01); *G06F 3/0679* (2013.01); *G11C 16/30* (2013.01)

(58) Field of Classification Search
CPC .... G06F 3/0625; G06F 3/0659; G06F 3/0679; G06F 1/3225; G06F 1/3275; G11C 16/30
See application file for complete search history.

(56) References Cited

U.S. PATENT DOCUMENTS

| | | | | |
|---|---|---|---|---|
| 11,360,530 | B1* | 6/2022 | Tang | G06F 1/3296 |
| 11,373,710 | B1* | 6/2022 | Hsu | G11C 16/30 |
| 2013/0301372 | A1* | 11/2013 | Park | G11C 7/22 365/227 |

\* cited by examiner

*Primary Examiner* — Pho M Luu
(74) *Attorney, Agent, or Firm* — Lowenstein Sandler LLP

(57) ABSTRACT

A method includes receiving a request to perform a memory access operation, wherein the memory access operation includes a set of sub-operations, selecting a current quantization data structure from a plurality of current quantization data structures, wherein each current quantization data structure of the plurality of current quantization data structures maintains, for each sub-operation of the set of sub-operations, a respective current quantization value reflecting an amount of current that is consumed by the respective sub-operation based on a set of peak power management (PPM) operation parameters, and causing the memory access operation to be performed using PPM based on the current quantization data structure.

20 Claims, 12 Drawing Sheets

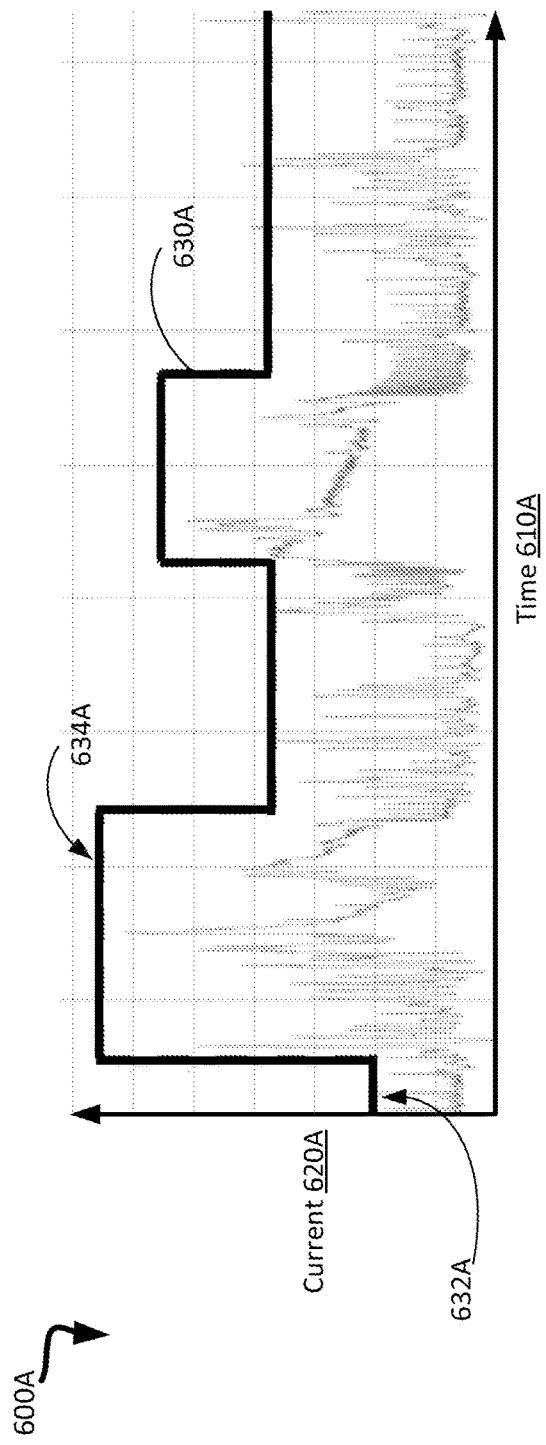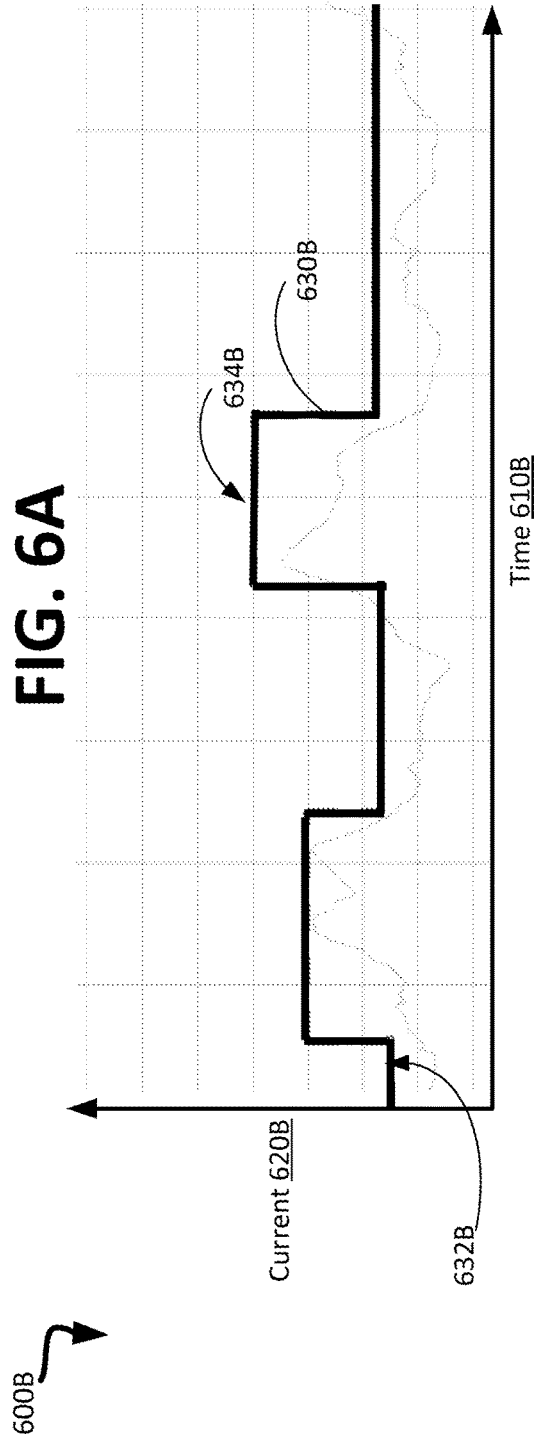

700A

| Sub-operation 710A | BC 720A | Q-value 730A |
|---|---|---|
| Sub-operation 1 | L to H | 4 |
| Sub-operation 2 | H to L | 1 |
| Sub-operation 3 | L to H | 7 |
| ... | | |
| Sub-operation N | N/A (H state) | 7 |
| ... | | |
| | | |
| | | |

| Sub-operation 710B | BC 720B | Q-value 730B |
|---|---|---|
| Sub-operation 1 | L to H | 4 |
| Sub-operation 2 | H to L | 1 |
| Sub-operation 3 | L to H | 6 |
| ... | | |
| Sub-operation N | H to L | 2 |
| ... | | |
| | | |
| | | |

FIG. 7B

MULTIPLE CURRENT QUANTIZATION VALUES FOR PEAK POWER MANAGEMENT

CROSS-REFERENCE TO RELATED APPLICATION(S)

The present application claims the benefit of U.S. Provisional Application 63/398,266, filed on Aug. 16, 2022 and entitled "MULTIPLE CURRENT QUANTIZATION VALUES FOR PEAK POWER MANAGEMENT", the entire contents of which are incorporated by reference herein.

TECHNICAL FIELD

Embodiments of the disclosure relate generally to memory sub-systems, and more specifically, relate to multiple current quantization values for peak power management (PPM) in a memory device.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIGS. 6A-6B are graphs of example current measurements plotted over time with respective time averaging windows, in accordance with some embodiments of the present disclosure.

FIGS. 7A-7B are diagrams illustrating example current quantization data structures, in accordance with some embodiments of the present disclosure.

DETAILED DESCRIPTION

Figure 1A:
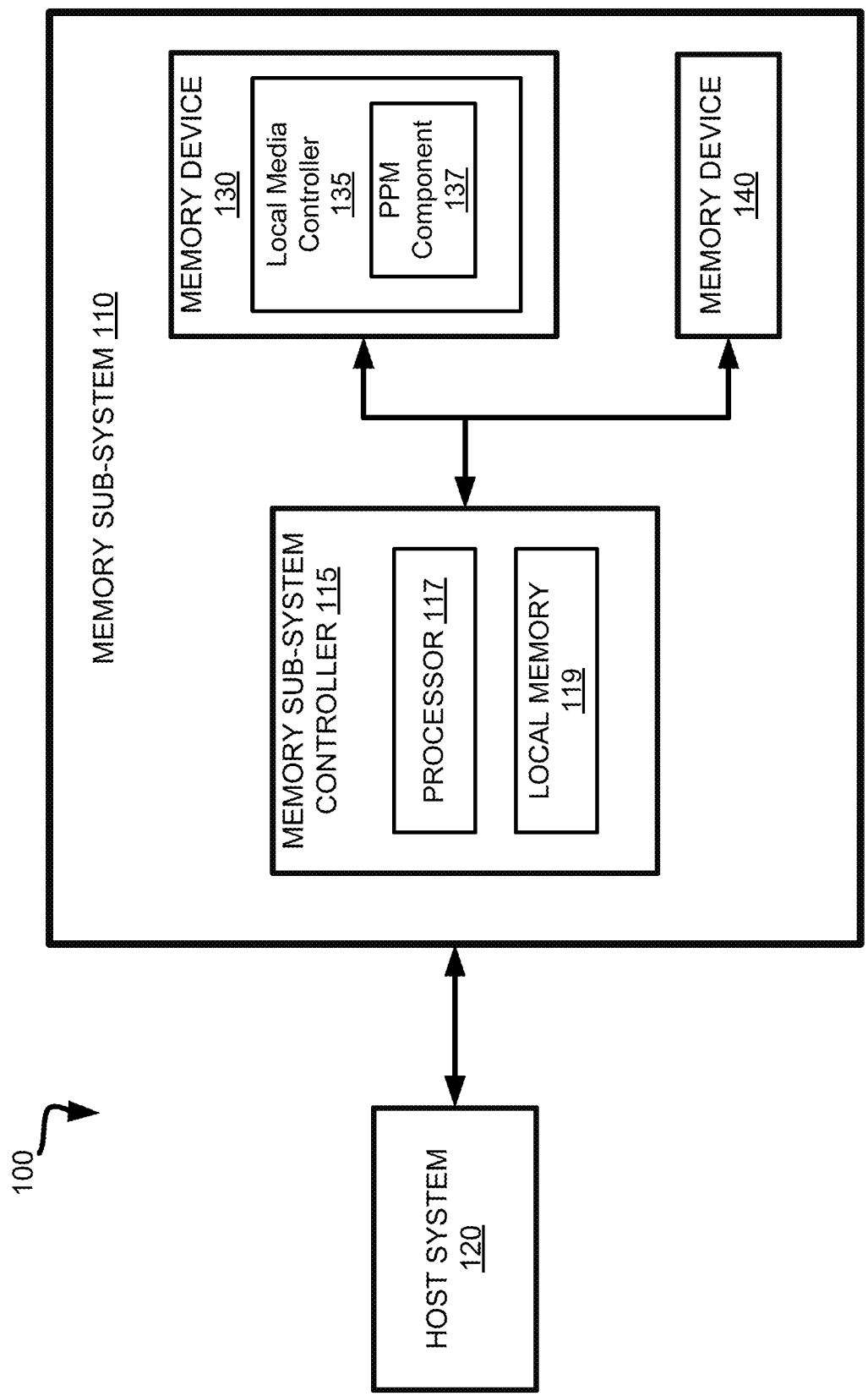
FIG. 1A illustrates an example computing system that includes a memory sub-system in accordance with some embodiments of the present disclosure.

Aspects of the present disclosure are directed to utilizing multiple current quantization values for peak power management (PPM) in a memory device. A memory sub-system can be a storage device, a memory module, or a combination of a storage device and memory module. Examples of storage devices and memory modules are described below in conjunction with FIGS. 1A-1B. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a negative-and (NAND) memory device. Other examples of non-volatile memory devices are described below in conjunction with FIGS. 1A-1B. A non-volatile memory device is a package of one or more dies. Each die can consist of one or more planes. For some types of non-volatile memory devices (e.g., NAND devices), each plane consists of a set of physical blocks. Each block consists of a set of pages. Each page consists of a set of memory cells. A memory cell is an electronic circuit that stores information. Depending on the memory cell type, a memory cell can store one or more bits of binary information, and has various logic states that correlate to the number of bits being stored. The logic states can be represented by binary values, such as "0" and "1", or combinations of such values.

A memory device can include multiple memory cells arranged in a two-dimensional or three-dimensional grid. The memory cells are formed onto a silicon wafer in an array of columns (also hereinafter referred to as bitlines) and rows (also hereinafter referred to as wordlines). A wordline can refer to one or more conductive lines of a memory device that are used with one or more bitlines to generate the address of each of the memory cells. The intersection of a bitline and wordline constitutes the address of the memory cell. A block hereinafter refers to a unit of the memory device used to store data and can include a group of memory cells, a wordline group, a wordline, or individual memory cells. One or more blocks can be grouped together to form a plane of the memory device in order to allow concurrent operations to take place on each plane. The memory device can include circuitry that performs concurrent memory page accesses of two or more memory planes. For example, the memory device can include a respective access line driver circuit and power circuit for each plane of the memory device to facilitate concurrent access of pages of two or more memory planes, including different page types. For ease of description, these circuits can be generally referred to as independent plane driver circuits. Control logic on the memory device includes a number of separate processing threads to perform concurrent memory access operations (e.g., read operations, program operations, and erase operations). For example, each processing thread corresponds to a respective one of the memory planes and utilizes the associated independent plane driver circuits to perform the memory access operations on the respective memory plane. As these processing threads operate independently, the power usage and requirements associated with each processing thread also varies.

A memory device can be a three-dimensional (3D) memory device. For example, a 3D memory device can be a three-dimensional (3D) replacement gate memory device (e.g., 3D replacement gate NAND), which is a memory device with a replacement gate structure using wordline stacking. For example, a 3D replacement gate memory device can include wordlines, select gates, etc. located between sets of layers including a pillar (e.g., polysilicon pillar), a tunnel oxide layer, a charge trap (CT) layer, and a dielectric (e.g. oxide) layer. A 3D replacement gate memory device can have a "top deck" corresponding to a first side and a "bottom deck" corresponding to a second side. For example, the first side can be a drain side and the second side can be a source side. Data in a 3D replacement gate memory device can be stored as 1 bit/memory cell (SLC), 2 bits/memory cell (MLC), 3 bits/memory cell (TLC), etc.

Various access lines, data lines and voltage nodes can be charged or discharged during sense (e.g., read or verify), program, and erase operations in a manner ensuring that memory array access operations would meet the relevant performance specifications. For sequential read or programming, multi-plane operations are often used to increase the system throughput. As a result, a memory device can have a high peak current usage, which might be a multiple of the average current amplitude. Thus, with such a high average market requirement of total current usage budget, it can become challenging to concurrently operate more than a certain number of memory devices.

Peak power management (PPM) can be utilized as a technique to manage power consumption of a memory device containing multiple memory dies ("dies"), many of which rely on a controller to stagger the activity of the dies seeking to avoid performing high power portions of memory access operations concurrently in more than one die. A PPM system can implement a PPM communication protocol, which is an inter-die communication protocol that can be used for limiting and/or tracking current or power consumed by each die. Each die can include a PPM component that exchanges information with its own local media controller (e.g., NAND controller) and other PPM components of the other dies via a communication bus. Each PPM component can be configured to perform power or current budget arbitration for the respective die. For example, each PPM component can implement predictive PPM to perform predictive power budget arbitration for the respective memory device.

The PPM communication protocol can employ a token-based round robin protocol, whereby each PPM component rotates as a holder of a PPM token in accordance with a token circulation time period. Circulation of the token among the memory devices can be controlled by a common clock signal ("ICLK"). For example, the dies can include a designated primary die that generates the common clock signal received by each active PPM component, with the remaining dies being designated as secondary dies. The token circulation time period can be defined by a number of clock cycles of the common clock signal, and the memory device can pass the token to the next memory device after the number of clock cycles has elapsed.

A die counter can be used to keep track of which die is holding the token. Each die counter value can be univocally associated with a respective die by utilizing a special PPM address for each die. The die counter can be updated upon the passing of the token to the next die.

While holding the token, the PPM component broadcasts, to the other dies, information encoding the amount of current used by its respective die during a given time period (e.g., a quantized current budget). The information can be broadcast using a data line. For example, the data line can be a high current (HC #) data line. The amount of information can be defined by a sequence of bits, where each bit corresponds to the logic level of a data line signal (e.g., an HC #signal) at a respective clock cycle (e.g., a bit has a value of "0" if the HC #signal is logic low during a clock cycle, or a value of "1" if the clock pulse is logic high during a clock cycle). For example, if a die circulates the token after three clock cycles, then the information can include three bits. More specifically, a first bit corresponds to the logic level of the HC #signal during a first clock cycle, a second bit corresponds to the logic level of the HC #signal during a second clock cycle, and a third bit corresponds to the logic level of the HC #signal during the third clock cycle. Accordingly, the token circulation time period (e.g., number of clock cycles) can be defined in accordance with the amount of information to be broadcast by a holder of the token (e.g., number of bits).

While holding the token, the PPM component can issue a request for a certain amount of current to be reserved in order to execute a memory access operation. The system can have a designated maximum current budget, and at least a portion of the maximum current budget may be currently reserved for use by the other memory dies. Thus, an available current budget can be defined as the difference between the maximum current budget and the total amount of reserved current budget during the current token circulation cycle. If the amount of current of the request is less than or equal to the available current budget during the current cycle, then the request is granted and the local media controller can cause the memory access operation to be executed. Otherwise, if the amount of current of the new request exceeds the available current budget, then the local media controller can be forced to wait for sufficient current budget to be made available by the other die(s) to execute the memory access operation (e.g., wait at least one current token circulation cycle).

Each PPM component can maintain the information broadcast by each die (e.g., within respective registers), which enables each die to calculate the current consumption. For example, if there are four dies Die 0 through Die 3, each Die 0 through Die 3 can maintain information broadcast by Die 0 through Die 3 within respective registers designated for Die 0 through Die 3. Since each of Die 0 through Die 3 maintains the maximum current budget the most updated current consumption, each of Die 0 through Die 3 can calculate the available current budget. Accordingly, each of Die 0 through Die 3 can determine whether there is a sufficient amount of available current budget for its local media controller to execute a new memory access operation.

A memory access operation (e.g., program operation, read operation or erase operation) can include multiple sub-operations arranged in an execution sequence. For example, the sub-operations can include an initial sub-operation to initiate the memory access operation, a final sub-operation to complete the memory access operation. The sub-operations can further include at least one intermediate sub-operation performed between the initial sub-operation and the final sub-operation. For each sub-operation, for the local media controller to determine whether there is sufficient available current budget to proceed with execution of the sub-operation, the sub-operation can be assigned a current breakpoint. Each current breakpoint is defined (e.g., as a PPM parameter during initialization of PPM) at the beginning of its respective sub-operation to indicate whether the sub-operation will consume more current, less current, or the same amount of current as the previous sub-operation. Accordingly, current breakpoints can be used as a gating mechanism to control execution of a memory access operation.

For example, a high current (HC) breakpoint indicates that its respective sub-operation will be consuming an amount of current that is greater than the amount of current consumed to execute the previous sub-operation. Thus, the PPM component may have to reserve additional current to enable the local media controller to execute the sub-operation. For example, a first HC breakpoint can be defined with respect to an initial sub-operation of the memory access operation, since the initial sub-operation will necessarily consume a greater amount of current than the zero amount of current that was being consumed immediately before execution of the memory access operation. Upon reaching a HC breakpoint, the local media controller can communicate, with the PPM component, the amount of current that the memory device will be consuming to execute the respective sub-operation. The local media controller waits to receive a response (e.g., flag) indicating that there is sufficient available current budget that can be reserved for executing the respective sub-operation. Upon receiving the response from that PPM component that there is sufficient available current budget that can be reserved for executing the respective sub-operation, the local media controller can proceed with executing the respective sub-operation. Accordingly, the local media controller will execute a sub-operation at a HC breakpoint only if the PPM component indicates that there is sufficient available current in the current budget to do so.

In contrast to a HC breakpoint, a low current (LC) breakpoint indicates that its respective sub-operation will be consuming an amount of current that is less than or equal to the amount of current consumed to execute the previous sub-operation. Since the PPM component had already reserved enough current for executing the previous sub-operation, the local media controller will, upon reaching a LC breakpoint, proceed with executing the respective sub-operation using at least a portion of the already reserved current. However, the local media controller still communicates, with the PPM component, the amount of current that the memory device will be consuming to perform the sub-operation. For example, the PPM component can release an unused portion of the reserved current for the other dies.

Illustratively, if the memory access operation is a read operation, then the read operation can include a prologue sub-operation as the initial sub-operation, a read initialization sub-operation following the prologue sub-operation, a sensing sub-operation following the read initialization sub-operation, and a read recovery sub-operation following the sensing sub-operation. Respective HC breakpoints can be defined for the prologue sub-operation (as the initial sub-operation) and the read initialization sub-operation (since the read initialization sub-operation consumes more current than the prologue sub-operation). Respective LC breakpoints can be defined for the sensing sub-operation (since the sensing sub-operation does not consume more current than the read initialization sub-operation) and the read recovery sub-operation (since the read recovery sub-operation does not consume more current than the sensing sub-operation).

To determine the amount of current to reserve for executing a sub-operation of a memory access operation, a local media controller can maintain a current consumption data structure (e.g., a lookup table). More specifically, the current consumption data structure can include, for each sub-operation, a current consumption value assigned to the sub-operation reflecting a maximum amount of current consumption that the sub-operation can consume during execution. Each current consumption value can be derived from empirical analysis of current consumption waveforms during the performance of the memory access operation (e.g., at the design stage). For example, the empirical analysis can include identifying peaks along the current consumption waveforms, where each peak can represent current consumption during a respective sub-operation, and assigning respective current consumption values to sub-operations using the peaks. The local media controller can use the data structure to determine an amount of current to reserve for executing the sub-operation, and can cause the PPM component to reserve a sufficient amount of current for executing the sub-operation (e.g., if the sub-operation is defined by a HC breakpoint).

PPM operation can be defined by various PPM operation parameters. One example of a PPM operation parameter is the PPM operating mode. Examples of PPM operating modes include a pump supply voltage (Vpp) enabled operating mode and a Vpp disabled operating mode. While in a Vpp enabled operating mode, current from a pumping circuit travels along a Vpp rail. While in a Vpp disabled operating mode, current travels along a separate power supply voltage (Vcc) rail. The Vpp rail can have a higher voltage than the Vcc rail. Therefore, a lower amount of current consumption may be measured along the Vcc rail. Another example of a PPM operation parameter is averaging timing, which refers to the time window during which current consumption is measured and averaged to obtain a current consumption profile. For example, a current consumption profile measured in a time averaging window can be different from a current consumption profile measured in a longer time averaging window. Accordingly, since current consumption observed for one PPM operation parameter can be different than current consumption observed for another PPM operation parameter, executing a sub-operation using a single assigned current consumption value across all PPM operation parameters can be sub-optimal, which can contribute to performance inefficiencies and/or penalties.

Aspects of the present disclosure address the above and other deficiencies by implementing multiple current quantization values ("Q-values") for PPM in a memory device of a memory sub-system. For a memory access operation including multiple sub-operations executed during PPM, each sub-operation can be assigned with multiple Q-values, where each Q-value is selected to account for a respective PPM operation parameter. More specifically, for each sub-operation, a Q-value of a PPM operation parameter is a value reflecting a maximum amount of current that is consumed by the sub-operation with respect to the PPM operation parameter. For example, the Q-values assigned to a sub-operation can include Q-values assigned for respective PPM operating mode (e.g., Vpp enabled and Vpp disabled). As another example, the Q-values assigned to a sub-operation can include Q-values assigned for respective time averaging windows for measuring current consumption.

The memory device can maintain, for each PPM operation parameter, a respective current quantization data structure (e.g., a lookup table). The memory device can thus maintain a set of current quantization data structures, where each current quantization data structure is defined for a respective PPM operation parameter. Each current quantization data structure can be accessed by the local media controller to manage execution of a memory access operation.

Each current quantization data structure for a memory access operation can maintain, for each sub-operation, a respective Q-value for the sub-operation. As will be described in further detail below with reference to FIGS. 5A-6B, Q-values with respect to a PPM operation parameter can be determined by performing an empirical analysis of current consumption waveforms during memory device testing. For example, the empirical analysis can include identifying peaks along the current consumption waveforms, where each peak can represent current consumption during a respective sub-operation, and assigning respective Q-values to sub-operations using the peaks. In some embodiments, each Q-value represents a multiple of a current quantization step determined from the current consumption waveform analysis. The current quantization step size is determined in accordance with a quantization resolution defined by a number of bits, where the number of bits determines the number of Q-values.

For example, for a quantization resolution defined by N bits, there can be a total of 2 N Q-values. The initial Q-value ("$Q_0$") can define a zero current quantization level in which zero current is consumed, and the remaining $2^N-1$ Q-values can define levels of non-zero current consumption. For the remaining $2^N-1$ Q-values, the current consumption waveforms can be analyzed to identify a maximum current consumption value across all of the sub-operations. The maximum current consumption value can be divided by $2^N-1$ to determine the current quantization step size, which can be rounded up to the nearest integer. For example, a Q-value of $Q_1$ can have a magnitude equal to a single current quantization step size, a Q-value of $Q_2$ can have a magnitude of twice the current quantization step size, etc. The Q-value that is assigned to a sub-operation is the Q-value that has a lowest magnitude (i.e., lowest multiple of the current quantization step size) that is greater than or equal to the maximum current consumption observed during the sub-operation.

Illustratively, if N=3, then there are eight total Q-values (i.e., $2^3$), where $Q_0$ can define a value of zero current quantization value in which zero current is consumed, and the remaining seven Q-values $Q_1$ through $Q_7$ can define respective values of non-zero current consumption. For the remaining seven Q-values, the maximum current consumption value can be divided by 7 to determine the current quantization step size. Each of the Q-values $Q_1$ through $Q_7$ can then each have a magnitude equal to their respective multiples of the current quantization step size. If the maximum current consumption value observed during the empirical analysis of current consumption waveforms is X milliamperes (mA), then the current quantization step size would be X/7 mA. Thus, $Q_0$=0 mA, $Q_1$=X/7 mA, $Q_2$=2X/7 mA, $Q_3$=3X/7 mA, etc. If the maximum current consumption observed during a particular sub-operation of a memory access operation is between 2X/7 mA and 3X/7 mA, then the sub-operation can be assigned a Q-value of $Q_3$ since 3X/7 mA is the lowest Q-value magnitude that is greater than or equal to Y mA. Further details regarding determining and assigning Q-values to respective sub-operations will be described herein below with reference to FIGS. 1A-8.

Additionally, each current quantization data structure can maintain, for each sub-operation, a respective breakpoint characteristic. A breakpoint characteristic is indicative of a type of breakpoint transition. Examples of breakpoint characteristics include LC breakpoint to HC breakpoint (L to H), HC breakpoint to LC breakpoint (H to L), and no breakpoint transition. The breakpoint characteristic for a sub-operation can be determined by comparing the Q-value of the sub-operation to the Q-value of the previous sub-operation. For example, if an initial sub-operation has a higher Q-value than a second sub-operation directly following the initial sub-operation is, then the initial sub-operation can be assigned an L to H breakpoint characteristic by definition (since zero current consumption is assumed before the initial sub-operation is performed). Additionally, the second sub-operation can be assigned a H to L breakpoint characteristic (since the Q-value of the second sub-operation is less than the Q-value of the initial sub-operation). If a third sub-operation directly following the second sub-operation is assigned the same Q-value as the second sub-operation, then the third sub-operation can be assigned an L breakpoint characteristic (indicating that there is no change from the previous LC breakpoint state).

For example, with respect to PPM operating modes, a first current quantization data structure can be maintained for the Vpp disabled operating mode and a second current quantization data structure can be maintained for a Vpp disabled operating mode. The first current quantization data structure can maintain, for each sub-operation, a respective Q-value and a respective breakpoint characteristic optimized for the Vpp disabled operating mode. The second current quantization data structure can maintain, for each sub-operation, a respective Q-value and a respective breakpoint characteristic optimized for the Vpp enabled operating mode. For at least one sub-operation, the Q-value and/or breakpoint characteristic maintained in the first current quantization data structure can be different from the Q-value and/or breakpoint characteristic maintained in the second current quantization data structure.

A local media controller of a memory device can initiate a memory access operation, e.g., in response to receiving a request from a host system via a memory sub-system controller). The local media controller can maintain a set of current quantization data structures, where each current quantization data structure is defined for a respective PPM operation parameter. As will be described in further detail below, the local media controller can determine whether PPM should be used to perform the memory access operation. If the local media controller determines that PPM is not needed, then the local media controller can cause the memory access operation to be performed without using PPM (i.e., without selecting a current quantization data structure from the set of current quantization data structures).

If the local media controller determines that the memory access operation should be performed using PPM, then the local media controller can select a current quantization data structure from the set of current quantization structures. More specifically, the current quantization structure is selected for the PPM operation parameter (e.g., PPM operation mode and/or time averaging window). For example, the local media controller can use a command (e.g., set feature command) to select the current quantization data structure. The local media controller can then cause the memory access operation to be performed using PPM using the selected current quantization data structure. For example, the local media controller can use the current quantization data structure to determine, for each sub-operation, the maximum current that can be needed to execute the sub-operation (i.e., from the Q-value), and determine whether any additional current needs to be reserved (in addition to the current reserved from the previous sub-operation) before executing the sub-operation (i.e., from the breakpoint characteristic).

In some embodiments, the set of current quantization data structures can include a current quantization data structure for the Vpp-enabled operating mode ("Vpp data structure"), a current quantization data structure implementing peak current control on Vcc in the Vpp-disabled operating mode ("first Vcc data structure"), and a current quantization data structure for implementing peak current control on Vcc in the Vpp-enabled operating mode ("second Vcc data structure"). If the local media controller determines that peak current control is not to be implemented on Vcc and Vpp, then the local media controller can cause the memory access operation to be performed without using PPM. If the local media controller determines that peak current control is to be implemented on Vcc and not on Vpp while in the Vpp disabled operating mode, then the local media controller can select the first Vcc data structure. If the local media controller determines that peak current control is to be implemented on Vcc and not on Vpp while in the Vpp enabled operating mode, then the local media controller can select the second Vcc data structure. If the local media controller determines that peak current control is to be implemented on Vpp and not on Vcc, then the local media controller can select the Vpp data structure. If the local media controller determines that peak current control is to be implemented on both Vcc and Vpp, then the local media controller can select both the second Vcc data structure and the Vpp data structure.

Advantages of the present disclosure include, but are not limited to, improved memory sub-system performance and QoS. For example, adaptively selecting current quantization as described herein can lead to optimized efficiency and performance with respect to a current budget for the memory sub-system.

FIG. 1A illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1A illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Pillar, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1A illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a negative-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level memory cells (SLC) can store one bit per memory cell. Other types of memory cells, such as multi-level memory cells (MLCs), triple level memory cells (TLCs), quad-level memory cells (QLCs), and penta-level memory cells (PLCs) can store multiple bits per memory cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1A has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local controller 132) on the die and a controller (e.g., memory sub-system controller 115) for media management within the same memory device package. An example of a managed memory device is a managed NAND (MNAND) device.

The local media controller 135 can utilize multiple current quantization for performing memory access operations with respect to the memory device 130 during PPM. In such an embodiment, PPM component 137 can be implemented by hardware and/or firmware, stored on memory device 130, executed by the control logic (e.g., local media controller 135) to perform the operations related to performing a memory access operation during PPM as described herein. In some embodiments, the memory sub-system controller 115 includes at least a portion of PPM component 137. For example, the memory sub-system controller 115 can include a processor 117 (e.g., a processing device) configured to execute instructions stored in local memory 119 for performing the operations described herein.

For example, the local media controller 135 can initiate a memory access operation. The memory access operation can be initiated in response to receiving a request from the memory sub-system controller 115 (e.g., via the host system 120).

The memory device 130 can maintain, for the memory access operation, a set of current quantization data structures. Each current quantization data structure of the set of current quantization structures is defined for a respective PPM operation parameter (e.g., predefined using empirical analysis of current consumption waveforms with respect to the PPM operation parameter). A current quantization data structure for a PPM operation parameter can maintain, for each sub-operation of the memory access operation, a respective Q-value and a respective breakpoint characteristic for the sub-operation with respect to the PPM operation parameter. In some embodiments, each current quantization data structure is a lookup table.

The local media controller 135 can determine whether PPM should be used to perform the memory access operation. In some embodiments, determining whether PPM should be used to perform the memory access operation includes determining whether to implement peak current control. For example, the local media controller 135 can obtain a peak current control parameter, and determine whether the peak current control parameter indicates that peak current control is to be implemented on Vcc or Vpp. If peak current control is not to be implemented on Vcc or Vpp, then PPM need not be used at all and the local media controller 135 can perform the memory access operation without PPM. Otherwise, if peak current control is to be implemented on at least one of Vcc or Vpp, then the local media controller 135 can perform the memory access operation with PPM. If the local media controller 135 determines not to use PPM to perform the memory access operation, then the local media controller 135 can cause the memory access operation to be performed without using PPM (i.e., without selecting a current quantization data structure from the set of current quantization data structures).

Otherwise, if the local media controller 135 determines that PPM should be used to perform the memory access operation, then the local media controller 135 can select a current quantization data structure from the set of current quantization structures to manage execution of the memory access operation, and can cause the memory access operation to be performed using the appropriate current quantization data structure. For example, the local media controller 135 can use a command (e.g., set feature command) to select the current quantization data structure. The current quantization data structure can be selected in view of a set of PPM operation parameters. For example, the set of PPM operation parameters can include a PPM operating mode (e.g., Vpp disabled operating mode or Vpp enabled operating mode). As another example, the set of PPM operation parameters can include a time averaging window.

For example, with respect to PPM operating modes, the set of current quantization data structures can include a first current quantization data structure for a Vpp disabled operating mode and a second current quantization data structure for a Vpp enabled operating mode. For at least one sub-operation, the Q-value and/or breakpoint characteristic maintained in the first current quantization data structure can be different from the Q-value and/or breakpoint characteristic maintained in the second current quantization data structure.

Additionally or alternatively, in some embodiments, the set of current quantization data structures can include a current quantization data structure for the Vpp enabled operating mode ("Vpp data structure"), a current quantization data structure for implementing peak current control on Vcc in the Vpp disabled operating mode ("first Vcc data structure"), and a current quantization data structure for implementing peak current control on Vcc in the Vpp enabled operating mode ("second Vcc data structure"). If peak current control is to be implemented on Vcc and not on Vpp while in the Vpp disabled operating mode, then the local media controller 135 can select the first Vcc data structure. If peak current control is to be implemented on Vcc and not on Vpp while in the Vpp enabled operating mode, then the local media controller 135 can select the second Vcc data structure. If peak current control to be implemented on Vpp and not on Vcc, then the local media controller 135 can select the Vpp data structure. If peak current control is to be implemented on both Vcc and Vpp, then the local media controller 135 can select both the second Vcc data structure and the Vpp data structure. Further details regarding the operations of the local media controller 135 and PPM component 137 are described above, and will be described below with reference to FIGS. 1B-9.

Figure 1B:
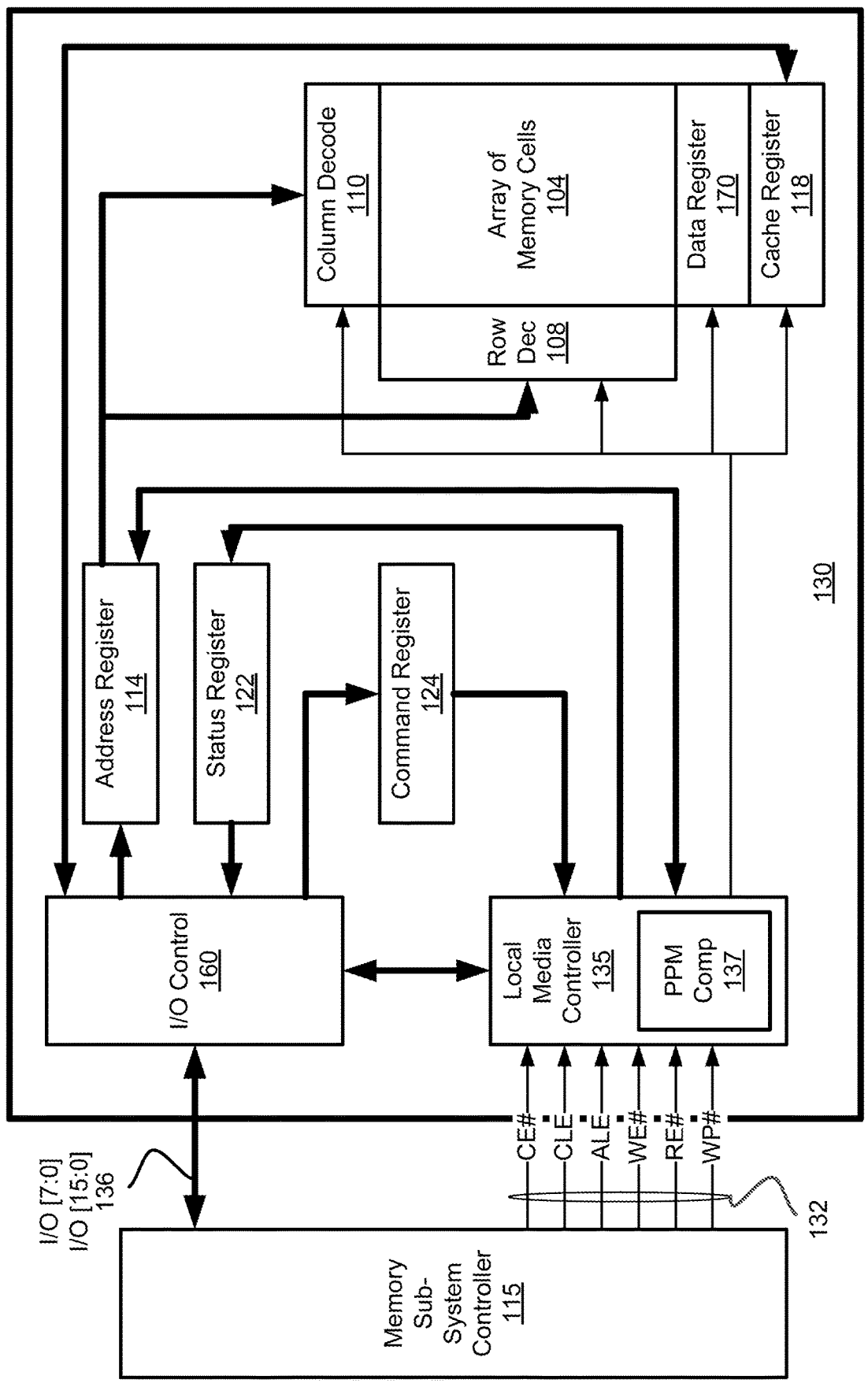
FIG. 1B is a block diagram of a memory device in communication with a memory sub-system controller of a memory sub-system in accordance with some embodiments of the present disclosure.

FIG. 1B is a simplified block diagram of a first apparatus, in the form of a memory device 130, in communication with a second apparatus, in the form of a memory sub-system controller 115 of a memory sub-system (e.g., memory sub-system 110 of FIG. 1A), according to an embodiment. Some examples of electronic systems include personal computers, personal digital assistants (PDAs), digital cameras, digital media players, digital recorders, games, appliances, vehicles, wireless devices, mobile telephones and the like. The memory sub-system controller 115 (e.g., a controller external to the memory device 130), may be a memory controller or other external host device.

Memory device 130 includes an array of memory cells 104 logically arranged in rows and columns. Memory cells of a logical row are typically connected to the same access line (e.g., a wordline) while memory cells of a logical column are typically selectively connected to the same data line (e.g., a bitline). A single access line may be associated with more than one logical row of memory cells and a single data line may be associated with more than one logical column. Memory cells (not shown in FIG. 1B) of at least a portion of array of memory cells 104 are capable of being programmed to one of at least two target data states.

Row decode circuitry 108 and column decode circuitry 110 are provided to decode address signals. Address signals are received and decoded to access the array of memory cells 104. Memory device 130 also includes input/output (I/O) control circuitry 160 to manage input of commands, addresses and data to the memory device 130 as well as output of data and status information from the memory device 130. An address register 114 is in communication with I/O control circuitry 160 and row decode circuitry 108 and column decode circuitry 110 to latch the address signals prior to decoding. A command register 124 is in communication with I/O control circuitry 160 and local media controller 135 to latch incoming commands.

A controller (e.g., the local media controller 135 internal to the memory device 130) controls access to the array of memory cells 104 in response to the commands and generates status information for the external memory sub-system controller 115, i.e., the local media controller 135 is configured to perform access operations (e.g., read operations, programming operations and/or erase operations) on the array of memory cells 104. The local media controller 135 is in communication with row decode circuitry 108 and column decode circuitry 110 to control the row decode circuitry 108 and column decode circuitry 110 in response to the addresses. In one embodiment, local media controller 135 includes the PPM component 137, which can implement the defect detection described herein during an erase operation on memory device 130.

The local media controller 135 is also in communication with a cache register 118. Cache register 118 latches data, either incoming or outgoing, as directed by the local media controller 135 to temporarily store data while the array of memory cells 104 is busy writing or reading, respectively, other data. During a program operation (e.g., write operation), data may be passed from the cache register 118 to the data register 170 for transfer to the array of memory cells 104; then new data may be latched in the cache register 118 from the I/O control circuitry 160. During a read operation, data may be passed from the cache register 118 to the I/O control circuitry 160 for output to the memory sub-system controller 115; then new data may be passed from the data register 170 to the cache register 118. The cache register 118 and/or the data register 170 may form (e.g., may form a portion of) a page buffer of the memory device 130. A page buffer may further include sensing devices (not shown in FIG. 1B) to sense a data state of a memory cell of the array of memory cells 204, e.g., by sensing a state of a data line connected to that memory cell. A status register 122 may be in communication with I/O control circuitry 160 and the local memory controller 135 to latch the status information for output to the memory sub-system controller 115.

Memory device 130 receives control signals at the memory sub-system controller 115 from the local media controller 135 over a control link 132. For example, the control signals can include a chip enable signal CE #, a command latch enable signal CLE, an address latch enable signal ALE, a write enable signal WE #, a read enable signal RE #, and a write protect signal WP #. Additional or alternative control signals (not shown) may be further received over control link 132 depending upon the nature of the memory device 130. In one embodiment, memory device 130 receives command signals (which represent commands), address signals (which represent addresses), and data signals (which represent data) from the memory sub-system controller 115 over a multiplexed input/output (I/O) bus 136 and outputs data to the memory sub-system controller 115 over I/O bus 136.

For example, the commands may be received over input/output (I/O) pins [7:0] of I/O bus 136 at I/O control circuitry 160 and may then be written into command register 124. The addresses may be received over input/output (I/O) pins [7:0] of I/O bus 136 at I/O control circuitry 160 and may then be written into address register 114. The data may be received over input/output (I/O) pins [7:0] for an 8-bit device or input/output (I/O) pins [15:0] for a 16-bit device at I/O control circuitry 160 and then may be written into cache register 118. The data may be subsequently written into data register 170 for programming the array of memory cells 104.

In an embodiment, cache register 118 may be omitted, and the data may be written directly into data register 170. Data may also be output over input/output (I/O) pins [7:0] for an 8-bit device or input/output (I/O) pins [15:0] for a 16-bit device. Although reference may be made to I/O pins, they may include any conductive node providing for electrical connection to the memory device 130 by an external device (e.g., the memory sub-system controller 115), such as conductive pads or conductive bumps as are commonly used.

It will be appreciated by those skilled in the art that additional circuitry and signals can be provided, and that the memory device 130 of FIGS. 1A-1B has been simplified. It should be recognized that the functionality of the various block components described with reference to FIGS. 1A-1B may not necessarily be segregated to distinct components or component portions of an integrated circuit device. For example, a single component or component portion of an integrated circuit device could be adapted to perform the functionality of more than one block component of FIGS. 1A-1B. Alternatively, one or more components or component portions of an integrated circuit device could be combined to perform the functionality of a single block component of FIGS. 1A-1B. Additionally, while specific I/O pins are described in accordance with popular conventions for receipt and output of the various signals, it is noted that other combinations or numbers of I/O pins (or other I/O node structures) may be used in the various embodiments.

Figure 2A:
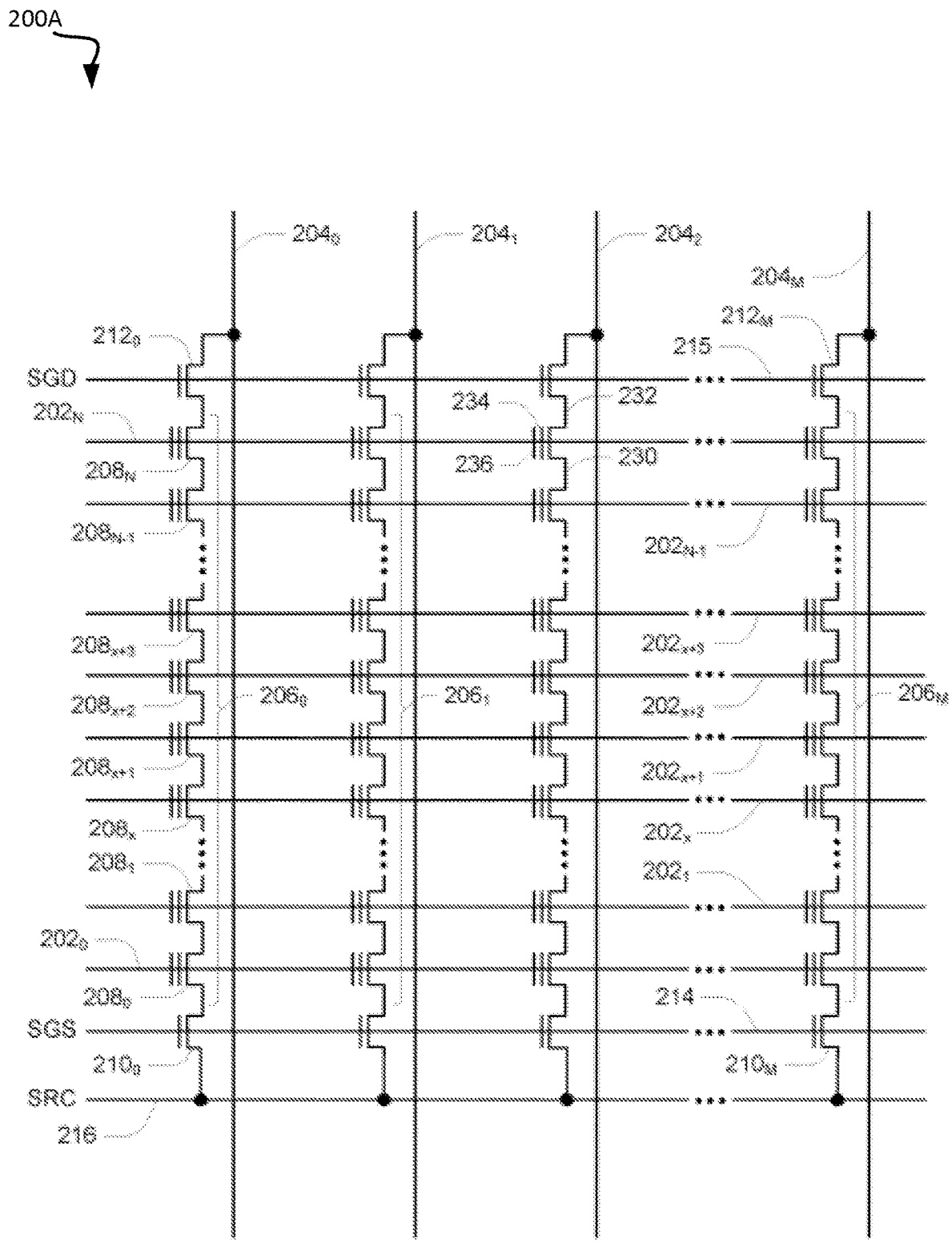
FIGS. 2A-2C are diagrams of portions of an example array of memory cells included in a memory device, in accordance with some embodiments of the present disclosure.
Figure 2B:
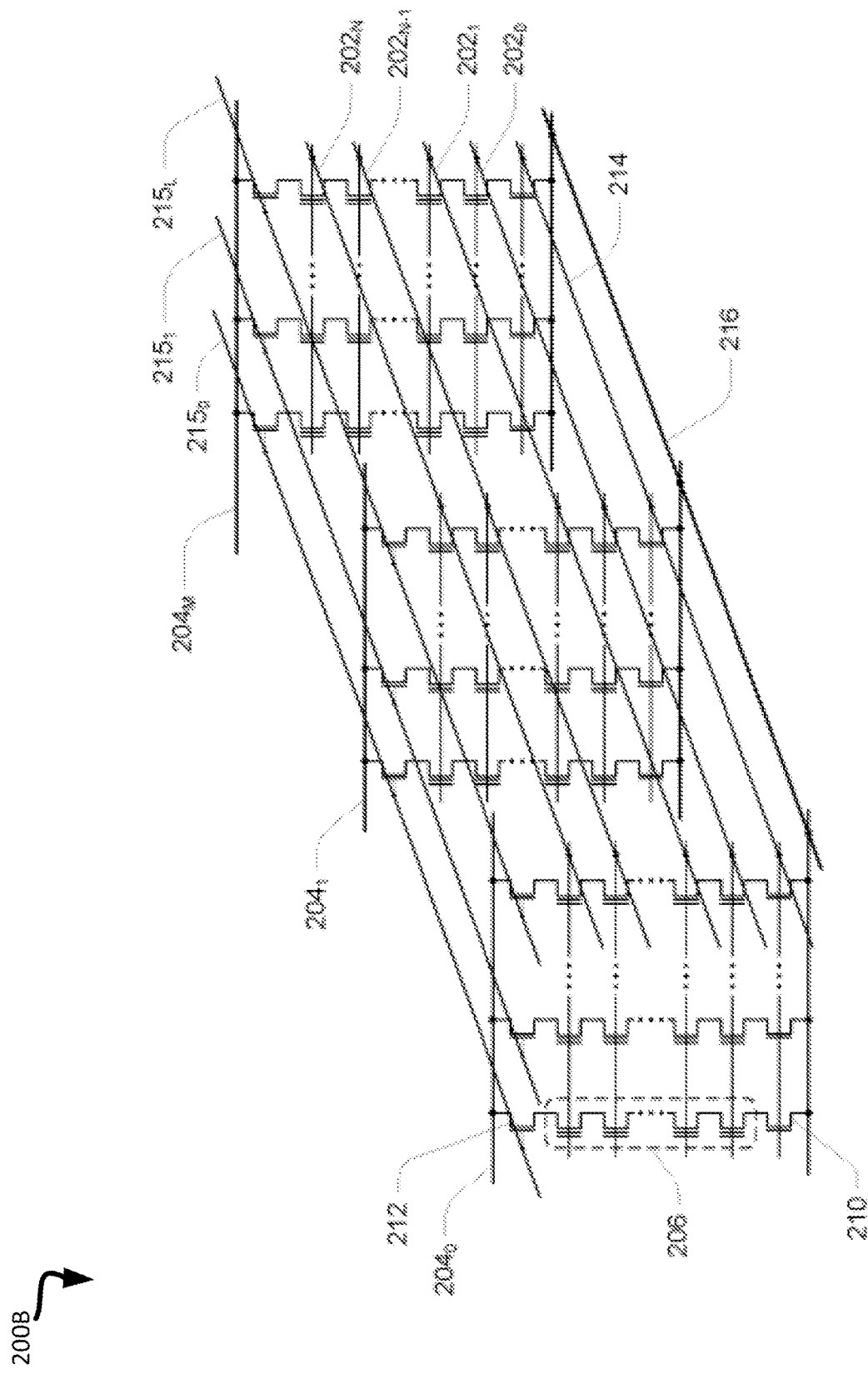
Figure 2C:
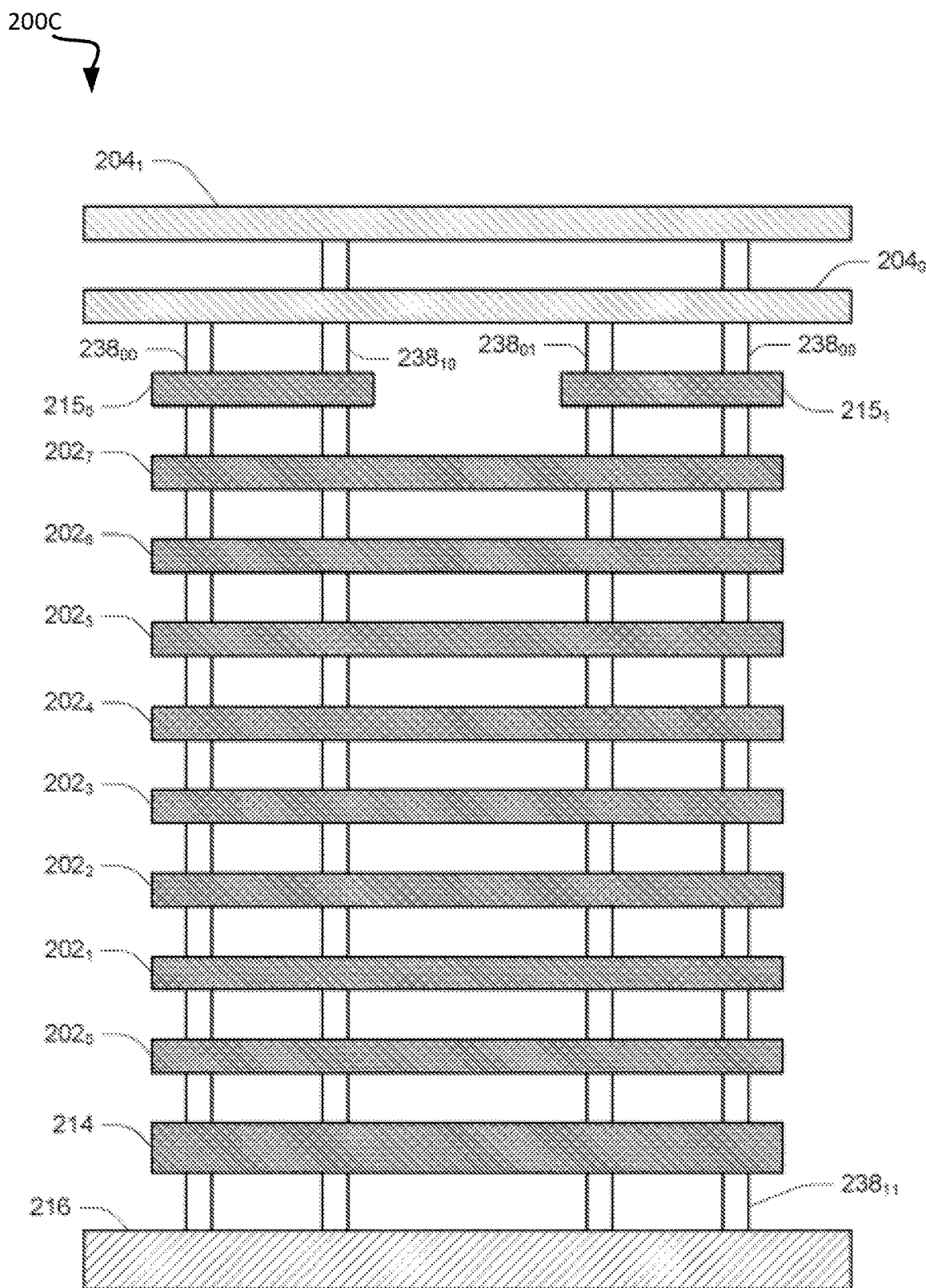

FIGS. 2A-2C are diagrams of portions of an example array of memory cells included in a memory device, in accordance with some embodiments of the present disclosure. For example, FIG. 2A is a schematic of a portion of an array of memory cells 200A as could be used in a memory device (e.g., as a portion of array of memory cells 104). Memory array 200A includes access lines, such as wordlines $202_0$ to $202_N$, and a data line, such as bitline 204. The wordlines 202 may be connected to global access lines (e.g., global wordlines), not shown in FIG. 2A, in a many-to-one relationship. For some embodiments, memory array 200A may be formed over a semiconductor that, for example, may be conductively doped to have a conductivity type, such as a p-type conductivity, e.g., to form a p-well, or an n-type conductivity, e.g., to form an n-well.

Memory array 200A can be arranged in rows each corresponding to a respective wordline 202 and columns each corresponding to a respective bitline 204. Rows of memory cells 208 can be divided into one or more groups of physical pages of memory cells 208, and physical pages of memory cells 208 can include every other memory cell 208 commonly connected to a given wordline 202. For example, memory cells 208 commonly connected to wordline $202_N$ and selectively connected to even bitlines 204 (e.g., bitlines $204_0$, $204_2$, $204_4$, etc.) may be one physical page of memory cells 208 (e.g., even memory cells) while memory cells 208 commonly connected to wordline $202_N$ and selectively connected to odd bitlines 204 (e.g., bitlines $204_1$, $204_3$, $204_5$, etc.) may be another physical page of memory cells 208 (e.g., odd memory cells). Although bitlines $204_3$-$204_5$ are not explicitly depicted in FIG. 2A, it is apparent from the figure that the bitlines 204 of the array of memory cells 200A may be numbered consecutively from bitline $204_0$ to bitline $204_M$. Other groupings of memory cells 208 commonly connected to a given wordline 202 may also define a physical page of memory cells 208. For certain memory devices, all memory cells commonly connected to a given wordline might be deemed a physical page of memory cells. The portion of a physical page of memory cells (which, in some embodiments, could still be the entire row) that is read during a single read operation or programmed during a single programming operation (e.g., an upper or lower page of memory cells) might be deemed a logical page of memory cells. A block of memory cells may include those memory cells that are configured to be erased together, such as all memory cells connected to wordlines $202_0$-$202_N$ (e.g., all strings 206 sharing common wordlines 202). Unless expressly distinguished, a reference to a page of memory cells herein refers to the memory cells of a logical page of memory cells.

Each column can include a string of series-connected memory cells (e.g., non-volatile memory cells), such as one of strings $206_0$ to $206_M$. Each string 206 can be connected (e.g., selectively connected) to a source line 216 (SRC) and can include memory cells $208_0$ to $208_N$. The memory cells 208 of each string 206 can be connected in series between a select gate 210, such as one of the select gates $210_0$ to $210_M$, and a select gate 212, such as one of the select gates $212_0$ to $212_M$. In some embodiments, the select gates $210_0$ to $210_M$ are source-side select gates (SGS) and the select gates $212_0$ to $212_M$ are drain-side select gates. Select gates $210_0$ to $210_M$ can be connected to a select line 214 (e.g., source-side select line) and select gates $212_0$ to $212_M$ can be connected to a select line 215 (e.g., drain-side select line). The select gates 210 and 212 might represent a plurality of select gates connected in series, with each select gate in series configured to receive a same or independent control signal. A source of each select gate 210 can be connected to SRC 216, and a drain of each select gate 210 can be connected to a memory cell $208_0$ of the corresponding string 206. Therefore, each select gate 210 can be configured to selectively connect a corresponding string 206 to SRC 216. A control gate of each select gate 210 can be connected to select line 214. The drain of each select gate 212 can be connected to the bitline 204 for the corresponding string 206. The source of each select gate 212 can be connected to a memory cell $208_N$ of the corresponding string 206. Therefore, each select gate 212 might be configured to selectively connect a corresponding string 206 to the bitline 204. A control gate of each select gate 212 can be connected to select line 215.

In some embodiments, and as will be described in further detail below with reference to FIG. 2B, the memory array in FIG. 2A is a three-dimensional memory array, in which the strings 206 extend substantially perpendicular to a plane containing SRC 216 and to a plane containing a plurality of bitlines 204 that can be substantially parallel to the plane containing SRC 216.

FIG. 2B is another schematic of a portion of an array of memory cells 200B (e.g., a portion of the array of memory cells 104) arranged in a three-dimensional memory array structure. The three-dimensional memory array 200B may incorporate vertical structures which may include semiconductor pillars where a portion of a pillar may act as a channel region of the memory cells of strings 206. The strings 206 may be each selectively connected to a bit line $204_0$-$204_M$ by a select gate 212 and to the SRC 216 by a select gate 210. Multiple strings 206 can be selectively connected to the same bitline 204. Subsets of strings 206 can be connected to their respective bitlines 204 by biasing the select lines $215_0$-$215_L$ to selectively activate particular select gates 212 each between a string 206 and a bitline 204. The select gates 210 can be activated by biasing the select line 214. Each wordline 202 may be connected to multiple rows of memory cells of the memory array 200B. Rows of memory cells that are commonly connected to each other by a particular wordline 202 may collectively be referred to as tiers.

FIG. 2C is a diagram of a portion of an array of memory cells 200C (e.g., a portion of the array of memory cells 104). Channel regions (e.g., semiconductor pillars) $238_{00}$ and $238_{01}$ represent the channel regions of different strings of series-connected memory cells (e.g., strings 206 of FIGS. 2A-2B) selectively connected to the bitline $204_0$. Similarly, channel regions $238_{10}$ and $238_{11}$ represent the channel regions of different strings of series-connected memory cells (e.g., NAND strings 206 of FIGS. 2A-2B) selectively connected to the bitline $204_1$. A memory cell (not depicted in FIG. 2C) may be formed at each intersection of an wordline 202 and a channel region 238, and the memory cells corresponding to a single channel region 238 may collectively form a string of series-connected memory cells (e.g., a string 206 of FIGS. 2A-2B). Additional features might be common in such structures, such as dummy wordlines, segmented channel regions with interposed conductive regions, etc.

Figure 3:
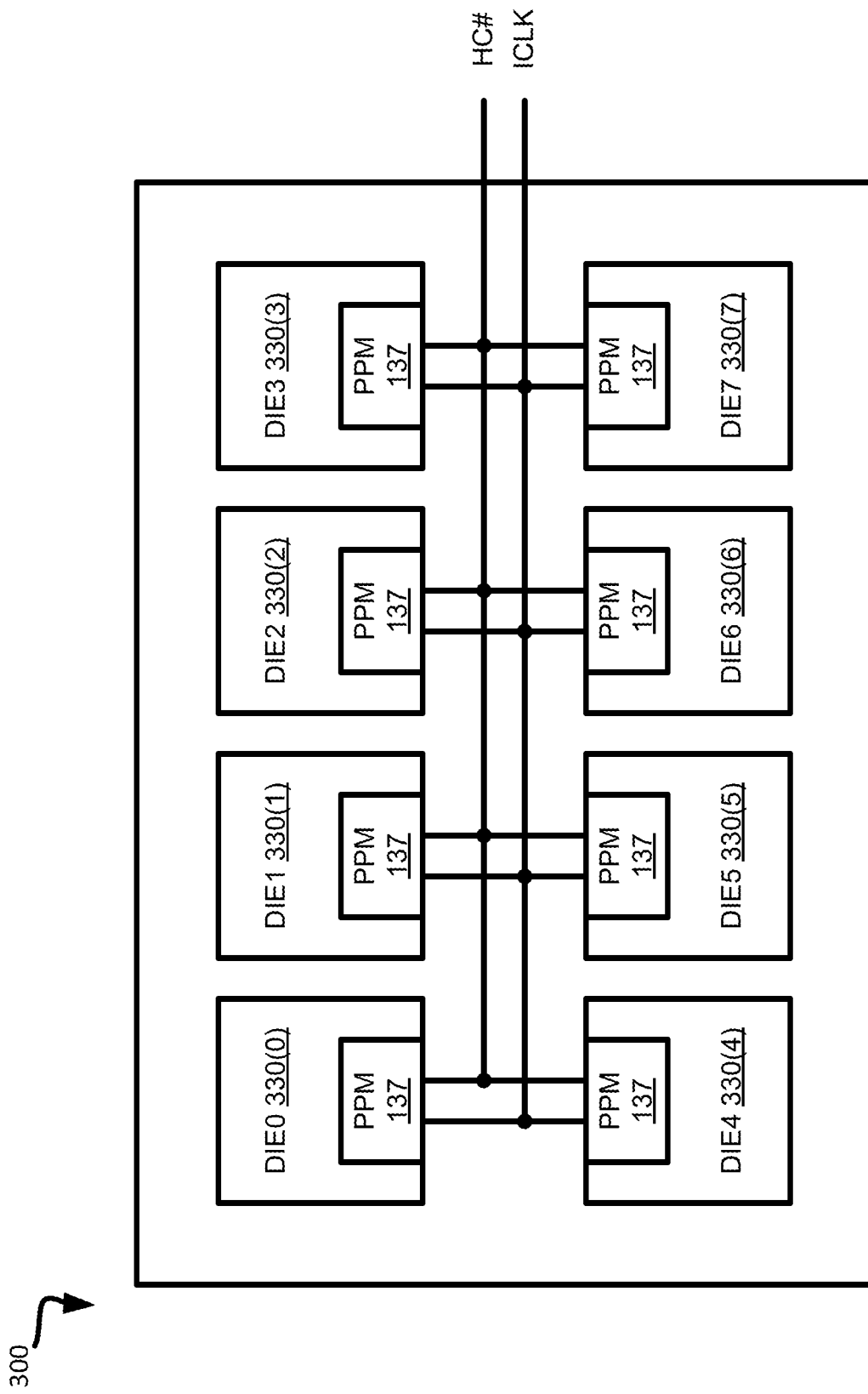
FIG. 3 is a block diagram illustrating a multi-die package with multiple memory dies in a memory sub-system, in accordance with some embodiments of the present disclosure.

FIG. 3 is a block diagram illustrating a multi-die package 300 with multiple memory dies in a memory sub-system, in accordance with some embodiments of the present disclosure. As illustrated, multi-die package 300 includes memory dies 330(0)-330(7). In other embodiments, however, multi-die package 300 can include some other number of memory dies, such as additional or fewer memory dies. In one embodiment, memory dies 330(0)-330(7) share a clock signal ICLK which is received via a clock signal line. Memory dies 330(0)-330(7) can be selectively enabled in response to a chip enable signal (e.g. via a control link), and can communicate over a separate I/O bus. In addition, a peak current magnitude indicator signal HC#is commonly shared between the memory dies 330(0)-330(7). The peak current magnitude indicator signal HC #can be normally pulled to a particular state (e.g., pulled high). In one embodiment, each of memory dies 330(0)-330(7) includes an instance of PPM component 137, which receives both the clock signal ICLK and the peak current magnitude indicator signal HC #.

In one embodiment, a token-based protocol is used where a token cycles through each of the memory dies 330(0)-330(7) for determining and broadcasting expected peak current magnitude, even though some of the memory dies 330(0)-330(7) might be disabled in response to their respective chip enable signal. The period of time during which a given PPM component 137 holds this token (e.g. a certain number of cycles of clock signal ICLK) can be referred to herein as a power management cycle of the associated memory die. At the end of the power management cycle, the token is passed to another memory die. Eventually the token is received again by the same PPM component 137, which signals the beginning of the power management cycle for the associated memory die. In one embodiment, the encoded value for the lowest expected peak current magnitude is configured such that each of its digits correspond to the normal logic level of the peak current magnitude indicator signal HC #where the disabled dies do not transition the peak current magnitude indicator signal HC #. In other embodiments, however, the memory dies can be configured, when otherwise disabled in response to their respective chip enable signal, to drive transitions of the peak current magnitude indicator signal HC #to indicate the encoded value for the lowest expected peak current magnitude upon being designated. When a given PPM component 137 holds the token, it can determine the peak current magnitude for the respective one of memory die 330(0)-330(7), which can be attributable to one or more processing threads on that memory die, and broadcast an indication of the same via the peak current magnitude indicator signal HC #. During a given power management cycle, the PPM component 137 can arbitrate among the multiple processing threads on the respective memory die using one of a number of different arbitration schemes in order to allocate that peak current to enable concurrent memory access operations.

Figure 4:
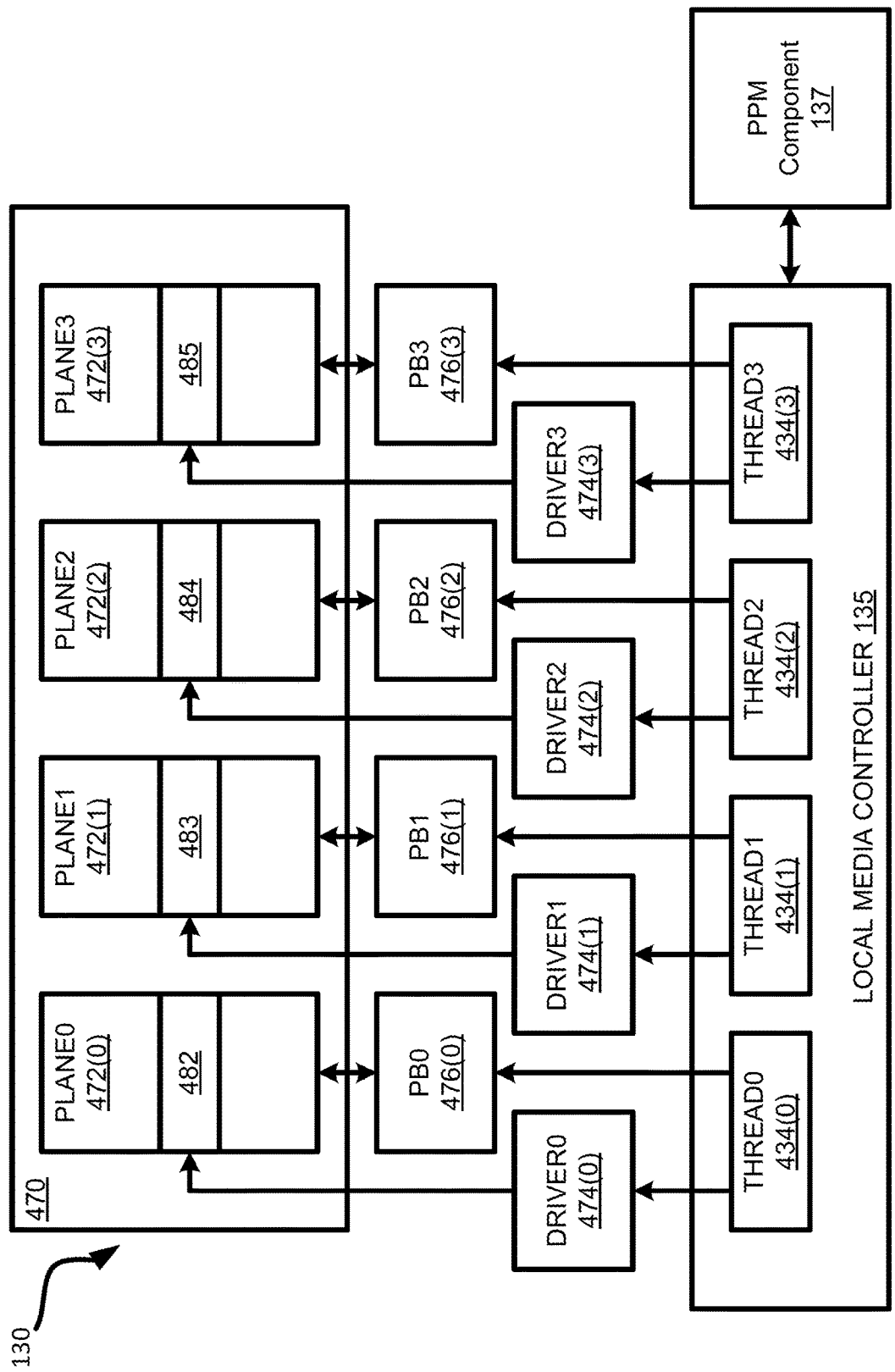
FIG. 4 is a block diagram illustrating a multi-plane memory device configured for independent parallel plane access, in accordance with some embodiments of the present disclosure.

FIG. 4 is a block diagram illustrating a multi-plane memory device 130 configured for independent parallel plane access, in accordance with some embodiments of the present disclosure. The memory planes 472(0)-472(3) can each be divided into blocks of data, with a different relative block of data from two or more of the memory planes 472(0)-472(3) concurrently accessible during memory access operations. For example, during memory access operations, two or more of data block 482 of the memory plane 472(0), data block 483 of the memory plane 472(1), data block 484 of the memory plane 472(2), and data block 485 of the memory plane 4372(3) can each be accessed concurrently.

The memory device 130 includes a memory array 470 divided into memory planes 472(0)-472(3) that each includes a respective number of memory cells. The multi-plane memory device 130 can further include local media controller 135, including a power control circuit and access control circuit for concurrently performing memory access operations for different memory planes 472(0)-472(3). The memory cells can be non-volatile memory cells, such as NAND flash cells, or can generally be any type of memory cells.

The memory planes 472(0)-472(3) can each be divided into blocks of data, with a different relative block of data from each of the memory planes 472(0)-472(3) concurrently accessible during memory access operations. For example, during memory access operations, data block 482 of the memory plane 472(0), data block 483 of the memory plane 472(1), data block 484 of the memory plane 472(2), and data block 485 of the memory plane 472(3) can each be accessed concurrently.

Each of the memory planes 472(0)-472(3) can be coupled to a respective page buffer 476(0)-476(3). Each page buffer 476(0)-476(3) can be configured to provide data to or receive data from the respective memory plane 472(0)-472(3). The page buffers 476(0)-476(3) can be controlled by local media controller 135. Data received from the respective memory plane 472(0)-472(3) can be latched at the page buffers 476(0)-476(3), respectively, and retrieved by local media controller 135, and provided to the memory sub-system controller 115 via the interface.

Each of the memory planes 472(0)-472(3) can be further coupled to a respective access driver circuit 474(0)-474(3), such as an access line driver circuit. The driver circuits 474(0)-474(3) can be configured to condition a page of a respective block of an associated memory plane 472(0)-472(3) for a memory access operation, such as programming data (i.e., writing data), reading data, or erasing data. Each of the driver circuits 474(0)-474(3) can be coupled to a respective global access lines associated with a respective memory plane 472(0)-472(3). Each of the global access lines can be selectively coupled to respective local access lines within a block of a plane during a memory access operation associated with a page within the block. The driver circuits 474(0)-474(3) can be controlled based on signals from local media controller 135. Each of the driver circuits 474(0)-474(3) can include or be coupled to a respective power circuit, and can provide voltages to respective access lines based on voltages provided by the respective power circuit. The voltages provided by the power circuits can be based on signals received from local media controller 135.

The local media controller 135 can control the driver circuits 474(0)-474(3) and page buffers 476(0)-476(3) to concurrently perform memory access operations associated with each of a group of memory command and address pairs (e.g., received from memory sub-system controller 115). For example, local media controller 135 can control the driver circuits 474(0)-474(3) and page buffer 476(0)-476(3) to perform the concurrent memory access operations. Local media controller 135 can include a power control circuit that serially configures two or more of the driver circuits 474(0)-474(3) for the concurrent memory access operations, and an access control circuit configured to control two or more of the page buffers 476(0)-476(3) to sense and latch data from the respective memory planes 472(0)-472(3), or program data to the respective memory planes 472(0)-472(3) to perform the concurrent memory access operations.

In operation, local media controller 135 can receive a group of memory command and address pairs via the bus, with each pair arriving in parallel or serially. In some examples, the group of memory command and address pairs can each be associated with different respective memory planes 472(0)-472(3) of the memory array 470. The local media controller 135 can be configured to perform concurrent memory access operations (e.g., read operations or program operations) for the different memory planes 472(0)-472(3) of the memory array 470 responsive to the group of memory command and address pairs. For example, the power control circuit of local media controller 135 can serially configure, for the concurrent memory access operations based on respective page type (e.g., UP, TP, LP, XP, SLC/MLC/TLC/QLC page), the driver circuits 474(0)-474(3) for two or more memory planes 472(0)-472(3) associated with the group of memory command and address pairs. After the access line driver circuits 474(0)-474(3) have been configured, the access control circuit of local media controller 135 can concurrently control the page buffers 476(0)-476(3) to access the respective pages of each of the two or more memory planes 472(0)-472(3) associated with the group of memory command and address pairs, such as retrieving data or writing data, during the concurrent memory access operations. For example, the access control circuit can concurrently (e.g., in parallel and/or contemporaneously) control the page buffers 476(0)-476(3) to charge/discharge bitlines, sense data from the two or more memory planes 472(0)-472(3), and/or latch the data.

Based on the signals received from local media controller 135, the driver circuits 474(0)-474(3) that are coupled to the memory planes 472(0)-472(3) associated with the group of memory command and address command pairs can select blocks of memory or memory cells from the associated memory plane 472(0)-472(3), for memory operations, such as read, program, and/or erase operations. The driver circuits 474(0)-474(3) can drive different respective global access lines associated with a respective memory plane 472(0)-472(3). As an example, the driver circuit 474(0) can drive a first voltage on a first global access line associated with the memory plane 472(0), the driver circuit 474(1) can drive a second voltage on a third global access line associated with the memory plane 472(1), the driver circuit 474(2) can drive a third voltage on a seventh global access line associated with the memory plane 472(2), etc., and other voltages can be driven on each of the remaining global access lines. In some examples, pass voltages can be provided on all access lines except an access line associated with a page of a memory plane 472(0)-472(3) to be accessed. The local media controller 135, the driver circuits 474(0)-474(3) can allow different respective pages, and the page buffers 476(0)-476(3) within different respective blocks of memory cells, to be accessed concurrently. For example, a first page of a first block of a first memory plane can be accessed concurrently with a second page of a second block of a second memory plane, regardless of page type.

The page buffers 476(0)-476(3) can provide data to or receive data from the local media controller 135 during the memory access operations responsive to signals from the local media controller 135 and the respective memory planes 472(0)-472(3). The local media controller 135 can provide the received data to memory sub-system controller 115.

It will be appreciated that the memory device 130 can include more or less than four memory planes, driver circuits, and page buffers. It will also be appreciated that the respective global access lines can include 8, 16, 32, 64, 128, etc., global access lines. The local media controller 135 and the driver circuits 474(0)-474(3) can concurrently access different respective pages within different respective blocks of different memory planes when the different respective pages are of a different page type. For example, local media controller 135 can include a number of different processing threads, such as processing threads 434(0)-434(3). Each of processing threads 434(0)-434(3) can be associated with a respective one of memory planes 472(0)-472(3), or a respective group of memory planes, and can manage operations performed on the respective plane or group of planes. For example, each of processing threads 434(0)-434(3) can provide control signals to the respective one of driver circuits 474(0)-474(3) and page buffers 476(0)-476(3) to perform those memory access operations concurrently (e.g., at least partially overlapping in time). Since the processing threads 434(0)-434(3) can perform the memory access operations, each of processing threads 434(0)-434(3) can have different current requirements at different points in time. PPM component 137 can determine the power budget needs of processing threads 434(0)-434(3) in a given power management cycle and identify one or more of processing threads 434(0)-434(3) using one of a number of power budget arbitration schemes described herein. The one or more processing threads 434(0)-434(3) can be determined based on an available power budget in the memory subsystem 110 during the power management cycles. For example, PPM component 137 can determine respective priorities of processing threads 434(0)-434(3), and allocate current to processing threads 434(0)-434(3) based on the respective priorities.

Figure 5A:
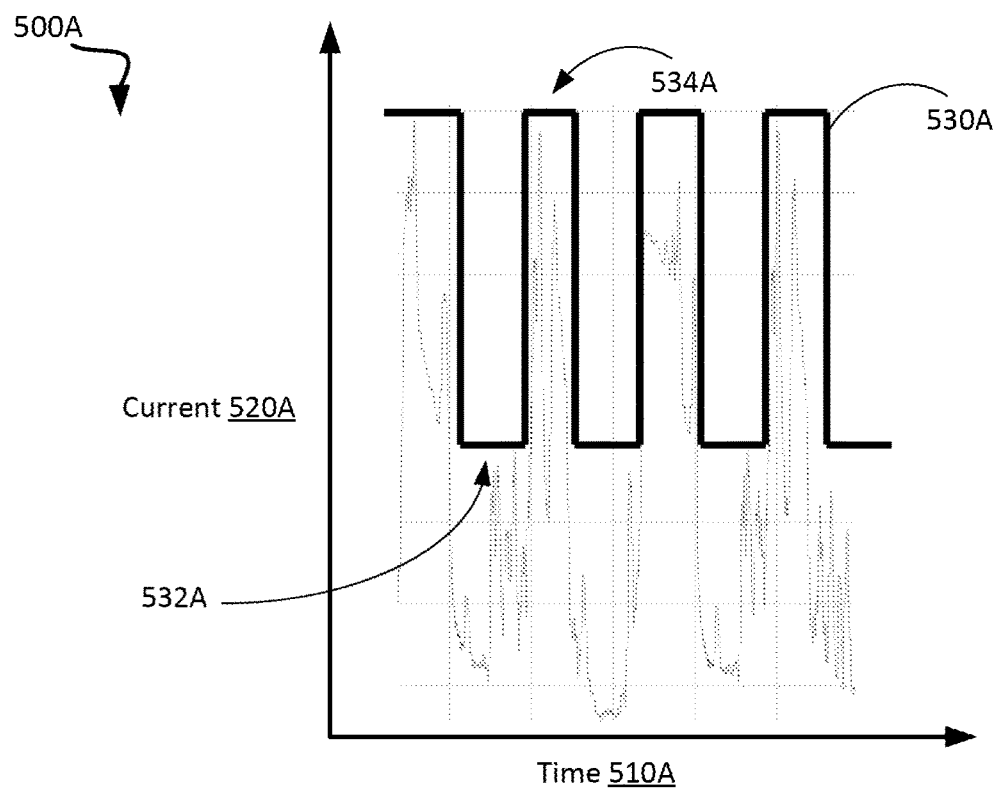
FIG. 5A-5B are graphs of example current measurements plotted over time in respective operating modes, in accordance with some embodiments of the present disclosure.
Figure 5B:
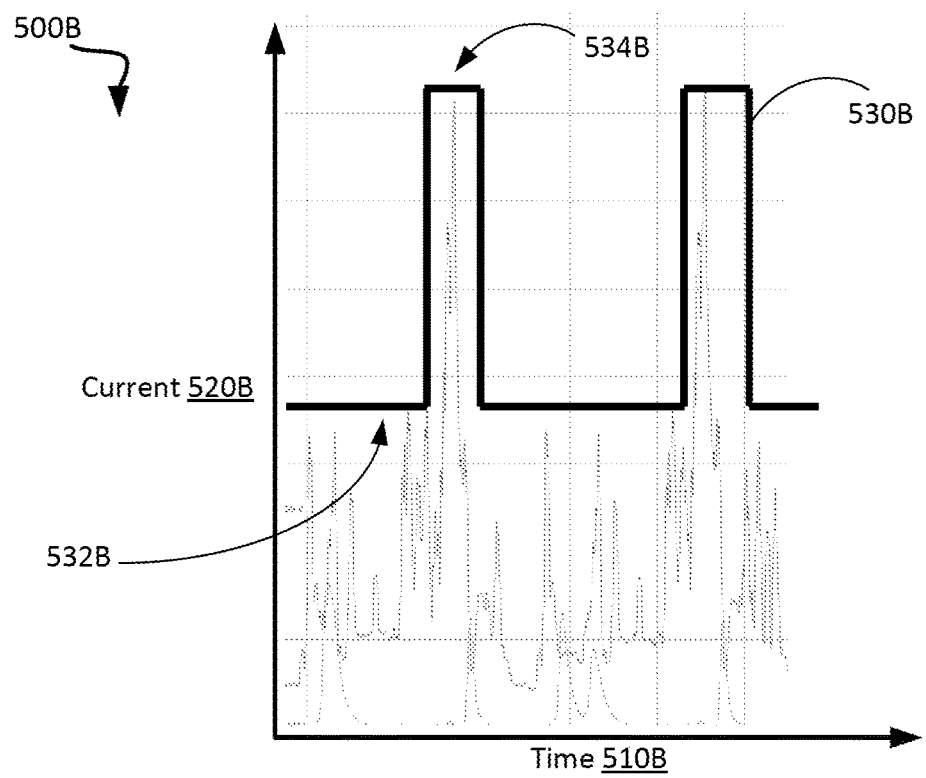

FIGS. 5A-5B are graphs of example current measurements over time in respective operating modes, in accordance with some embodiments of the present disclosure. For example, FIG. 5A illustrates a graph 500A of example current measurements plotted over time during performance of a memory access operation including multiple sub-operations in a Vpp disabled operating mode. Graph 500A includes an x-axis 510A corresponding to time and a y-axis 520A corresponding to current. FIG. 5B illustrates a graph 500B of example current measurements plotted over time during performance of a memory access operation including multiple sub-operations (e.g., the same memory access operation shown in the graph 500A of FIG. 5A) in a Vpp enabled operating mode. Graph 500B includes an x-axis 510B corresponding to time and a y-axis 520B corresponding to current. In some embodiments, the current is measured in milliamperes (mA). As mentioned above, a memory access operation can include multiple sub-operations. Each sub-operation can consume a respective amount of current from the current budget of the multi-die system. Thus, the graphs 500A and 500B depict current consumption during performance of sub-operations over time.

Graph 500A further depicts a current quantization plot ("plot") 530A and graph 500B depicts a plot 530B. Each of the plots 530A and 530B models a quantization of the current observed to be consumed over time. For example, the plots 530A and 530B can include quantized current valleys ("valleys") over respective intervals of time (e.g., valleys 532A and 532B) and quantized current peaks ("peaks") over respective intervals of time (e.g., peaks 534A and 534B). Each valley and peak are assigned to a respective sub-operation, and is indicative of a quantized amount of current determined from the current observed to be consumed over a particular time interval to perform the respective sub-operation.

The amount of current for each valley and peak can be reflected by a respective current quantization value ("Q-value"). Thus, valley 532A can also be referred to as Q-value 532A and peak 534A can also be referred to as Q-value 534A. Each Q-value can be defined by a number of bits N. The number of bits defining each Q-value can be used to divide the total current budget into a set of current levels, where each current level defines a respective Q-value.

For example, for a quantization resolution defined by Nbits, there can be a total of 2 N Q-values. An initial Q-value ("$Q_0$") can define a zero current quantization level in which zero current is consumed, and the remaining 2 N-1 Q-values can define levels of non-zero current consumption. For the remaining $2^N$-1 Q-values, the current consumption waveforms can be analyzed to identify a maximum current consumption value across all of the sub-operations. The maximum current consumption value can be divided by 2 N-1 to determine the current quantization step size, which can be rounded up to the nearest integer. For example, a Q-value of $Q_1$ can have a magnitude equal to a single current quantization step size, a Q-value of $Q_2$ can have a magnitude of twice the current quantization step size, etc. The Q-value that is assigned to a sub-operation is the Q-value that has a lowest magnitude (i.e., lowest multiple of the current quantization step size) that is greater than or equal to the maximum current consumption observed during the sub-operation.

In some embodiments, the Q-value is defined by three bits (N=3), and the set of current levels includes eight current levels defining eight respective Q-values. For example, $Q_0$ can define a value of zero current quantization value in which zero current is consumed, and the remaining seven Q-values $Q_1$ through $Q_7$ can define respective values of non-zero current consumption. For the remaining seven Q-values, the maximum current consumption value can be divided by 7 to determine the current quantization step size. Each of the Q-values $Q_1$ through $Q_7$ can then each have a magnitude equal to their respective multiples of the current quantization step size. If the maximum current consumption value observed during the empirical analysis of current consumption waveforms is X milliamperes (mA), then the current quantization step size would be X/7 mA. Thus, $Q_0$=0 mA, $Q_1$=X/7 mA, $Q_2$=2X/7 mA, $Q_3$=3X/7 mA, etc. If the maximum current consumption observed during a particular sub-operation of a memory access operation is between 2X/7 mA and 3X/7 mA, then the sub-operation can be assigned a Q-value of $Q_3$ since 3X/7 mA is the lowest Q-value magnitude that is greater than or equal to Y mA.

The current quantization modeled in the plot 530A is different from the current quantization modeled in the plot 530B due to the differences in peak current over time, resulting from the difference in PPM operation mode (i.e., Vpp disabled operating mode for plot 530A and Vpp enabled operating mode for plot 530B). Thus, the Q-value for a particular sub-operation can change depending on the PPM operating mode. Accordingly, a pair of Q-values can be assigned to each sub-operation, where one Q-value is derived from the plot 530A to be used for performing a sub-operation while in the Vpp disabled operating mode, and the other Q-value is derived from the plot 530B to be used for performing a sub-operation while in the Vpp enabled operating mode.

Each of the plots 530A and 530B further defines current breakpoints. More specifically, the current breakpoints can include low current (LC) breakpoints each defined when transitioning to a sub-operation having a lower current consumption than the previous sub-operation, and high current (HC) breakpoints each defined when transitioning to a sub-operation having a higher current consumption than the previous sub-operation. Each current breakpoint is associated with a respective sub-operation.

Transitioning from a first sub-operation having a first Q-value to a second sub-operation having a second Q-value different from the first Q-value can trigger a breakpoint change reflecting a breakpoint characteristic of the sub-operation. For example, if the first Q-value is less than the second Q-value, then the breakpoint change from the first sub-operation to the second sub-operation is a LC to HC breakpoint change, and the breakpoint characteristic for the second sub-operation can be referred to as "L to H". In this situation, the PPM component may need to reserve an additional current budget before allowing the local media controller to perform the second sub-operation. As another example, if the first Q-value is greater than the second Q-value, then the breakpoint change from the first sub-operation to the second sub-operation is a HC to LC breakpoint, and the breakpoint characteristic for the second sub-operation can be referred to as "H to L". In this situation, the local media controller can perform the second sub-operation without having to wait for additional current budget, since the PPM component had reserved sufficient current budget to perform the first sub-operation. The difference between the current budget for the first sub-operation and the current budget for the second sub-operation can be released by the PPM component and made available to other die(s) via their respective PPM component(s).

The Q-values and breakpoint characteristics for each sub-operation depicted in the plot 530A can be maintained in a current quantization data structure (e.g., lookup table) for the Vpp disabled operating mode. Moreover, the Q-values and breakpoint characteristics for each sub-operation depicted in the plot 530B can be maintained in a current quantization data structure for the Vpp enabled operating mode. These current quantization data structures can be included within a set of current quantization data structures maintained within the memory device, as described above with reference to FIG. 1A.

FIGS. 6A-6B are graphs of example current measurements over time with respective time averaging windows, in accordance with some embodiments of the present disclosure. For example, FIG. 6A illustrates a graph 600A of example current measurements plotted over time with a first time averaging window on the order of nanoseconds (ns) (e.g., 10 ns peak). Graph 600A includes an x-axis 610A corresponding to time and a y-axis 620A corresponding to current. FIG. 6B illustrates a graph 600B of example current measurements plotted over time with a second time averaging window on the order of microseconds (µs) (e.g., 4 µs peak). Graph 600B includes an x-axis 610B corresponding to time and a y-axis 520B corresponding to current. In some embodiments, the current is measured in mA. As mentioned above, a memory access operation can include multiple sub-operations. Each sub-operation can consume a respective amount of current from the current budget of the multi-die system. Thus, the graphs 600A and 600B depict current consumption during performance of sub-operations over time.

Graph 600A further depicts a current quantization plot ("plot") 630A and graph 600B further depicts a plot 630B. Similar to the current quantization plots 530A and 530B described above with reference to FIGS. 5A-5B, each of the plots 630A and 630B models a quantization of the current observed to be consumed over time. For example, the plots 630A and 630B can include quantized current valleys ("valleys") over respective intervals of time (e.g., valleys 632A and 632B) and quantized current peaks ("peaks") over respective intervals of time (e.g., peaks 634A and 634B). Each valley and peak is assigned to a respective sub-operation, and is indicative of a quantized amount of current determined from the current observed to be consumed over a particular time interval to perform the respective sub-operation. The amount of current for each valley and peak can be captured by a respective Q-value. Thus, valley 632A can also be referred to as Q-value 632A and peak 634A can also be referred to as Q-value 634A. Further details regarding the Q-values are described above with reference to FIGS. 1A and 5A-5B.

The current quantization modeled in the plot 630A is different from the current quantization modeled in the plot 630B due to the differences in time averaging windows (i.e., the first time averaging window for plot 630A and the second time averaging window for plot 630B). Thus, the Q-value for a particular sub-operation can change depending on the time averaging window. Accordingly, a pair of Q-values can be assigned to each sub-operation, where one Q-value is derived from the plot 630A to be used for performing a sub-operation based on the first time averaging window, and the other Q-value is derived from the plot 630B to be used for performing a sub-operation based on the second time averaging window.

Each of the plots 630A and 630B further defines current breakpoints over respective intervals of time. More specifically, the current breakpoints can include LC breakpoints each defined when transitioning to a sub-operation having a lower current consumption than the previous sub-operation, and HC breakpoints each defined when transitioning to a sub-operation having a high current consumption than the previous sub-operation. Each current breakpoint is associated with a respective sub-operation. Further details regarding current breakpoints are described above with reference to FIGS. 1A and 5A-5B.

The Q-values and breakpoint characteristics for each sub-operation depicted in the plot 630A can be maintained in a current quantization data structure (e.g., lookup table) for the first time averaging window. Moreover, the Q-values and breakpoint characteristics for each sub-operation depicted in the plot 630B can be maintained in a current quantization data structure for the second time averaging window. These current quantization data structures can be included within a set of current quantization data structures maintained within the memory device, as described above with reference to FIG. 1A. Example current quantization data structures will now be described below with reference to FIGS. 7A-7B.

FIGS. 7A-7B are diagrams illustrating example current quantization data structures ("data structures") 700A and 700B, in accordance with some embodiments. For example, the data structures 700A and 700B can be lookup tables. Each of the data structures 700A and 700B can be selected for at least one PPM parameter. For example, data structure 700A can be selected for a Vpp disabled operating mode (e.g., as described above with reference to FIG. 5A) and data structure 700B can be selected for a Vpp enabled operating mode (e.g., as described above with reference to FIG. 5B). As another example, data structure 700A can be selected for a first time averaging window (e.g., as described above with reference to FIG. 6A) and data structure 700B can depict a current quantization data structure for a second time averaging window (e.g., as described above with reference to FIG. 6B).

In these illustrative examples, it is assumed that the memory access operation includes N sub-operations, "Sub-operation 1" through "Sub-operation N." For example, Sub-operation 1 can be an initial sub-operation, and Sub-operations 2 through N can form a set of sub-operations. The set of sub-operations can define a loop that can be repeated a certain number of times in accordance with the programming operation. In some embodiments, the memory access operation is a programming operation. For example, Sub-operation 1 can be a prologue sub-operation for the programming operation, and Sub-operation N can be a program inhibit sub-operation.

As shown in FIG. 7A, data structure 700A includes a sub-operation column 710A, a breakpoint characteristic (BC) column 720A and a Q-value column 730A. Sub-operation 1 is assigned a BC "L to H" and a Q-value of "4". Sub-operation 2 is assigned a BC "H to L" and a Q-value of "1". "Sub-operation 3" is assigned a BC of "L to H" and a Q-value of "7". Sub-operation N is assigned a BC of "N/A" and a Q-value of "7" (i.e., there is no change in Q-value). The Q-values shown in diagram 700A are optimized for at least one parameter (e.g., Vpp disabled operating mode).

As shown in FIG. 7A, data structure 700B includes a sub-operation column 710B, a BC column 720B and a Q-value column 730B. Sub-operation 1 is similarly assigned a BC "L to H" and a Q-value of "4", and Sub-operation 2 is similarly assigned a BC "H to L" and a Q-value of "1". However, in this example, Sub-operation 3 is assigned a BC of "L to H" and a Q-value of "6", and Sub-operation N is assigned a BC of "H to L" and a Q-value of "2" (i.e., there is now a decrease in Q-value). The Q-values shown in diagram 700B are optimized for at least one parameter (e.g., Vpp enabled operating mode).

Figure 8:
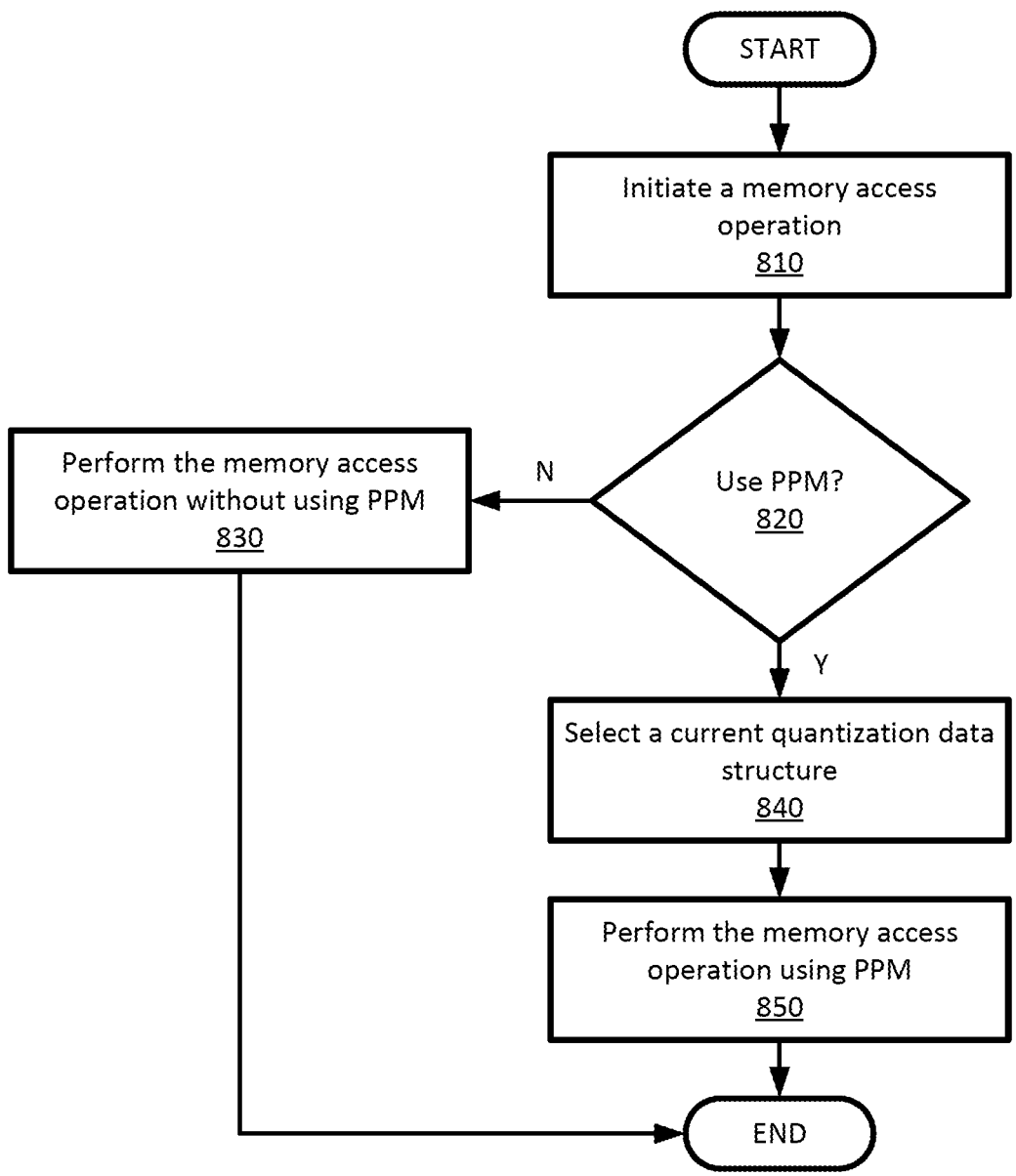
FIG. 8 is a flow diagram of a method to utilize multiple current quantization values for peak power management (PPM) in a memory device, in accordance with some embodiments of the present disclosure.

FIG. 8 is a flow diagram of a method 800 to utilize multiple current quantization values for peak power management (PPM) in a memory device, in accordance with some embodiments of the present disclosure. The method 800 can be performed by control logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 800 is performed by the local media controller 135 and/or the PPM component 137 of FIGS. 1A-1B. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 810, a memory access operation is initiated. For example, control logic can receive, from a memory sub-system controller (e.g., memory sub-system controller 115), a request to perform the memory access operation with respect to a memory device, such as memory device 130. In some embodiments, the memory device 130 is a die of a multi-die memory sub-system, such as memory sub-system 110. The control logic can communicate with PPM components of other dies of the memory device to implement PPM via a token communication bus. For example, the memory access operation can be a read operation, a write operation, an erase operation, etc. The memory access operation can include multiple sub-operations. For example, the sub-operations can include an initial sub-operation and a set of sub-operations performed after the initial sub-operation.

At operation 820, it is determined whether to use PPM. For example, control logic can determine whether to use PPM to perform the memory access operation based on a set of PPM operation parameters. For example, the set of PPM operation parameters can include a parameter indicating whether peak current control is to be implemented on Vcc or Vpp. If peak current control is not to be implemented on Vcc or Vpp, then PPM need not be used at all. Otherwise, if peak current control is to be implemented on at least one of Vcc or Vpp, then the local media controller determine that PPM is to be used to perform the memory access operation with PPM.

If it is determined that PPM is not to be used to perform the memory access operation, then the memory access operation can be performed without using PPM at operation 830. For example, control logic can cause the memory access operation to be performed without using PPM.

If it is determined that PPM is to be used to perform the memory access operation, then at operation 840, a current quantization data structure is selected. For example, control logic can select the current quantization data structure from a plurality of current quantization data structures, and control logic can cause the memory access operation to be performed using PPM using the current quantization data structure. In some embodiments, selecting the current quantization data structure comprises receiving a command selecting the current quantization data structure. For example, the command can be a set feature command.

In some embodiments, the plurality of current quantization data structures includes a PPM operating mode current quantization data structure defined for a respective PPM operating mode indicative of whether a pump supply voltage rail is enabled. For example, the plurality of current quantization data structures can include a current quantization data structure for the Vpp enabled operating mode ("Vpp data structure"), a current quantization data structure for implementing peak current control on Vcc in the Vpp disabled operating mode ("first Vcc data structure"), and a current quantization data structure for implementing peak current control on Vcc on Vcc in the Vpp enabled operating mode ("second Vcc data structure"). If peak current control is to be implemented on Vcc and not on Vpp while in the Vpp disabled operating mode, control logic can select the first Vcc data structure. If peak current control is to be implemented on Vcc and not on Vpp while in the Vpp enabled operating mode, then control logic can select the second Vcc data structure. If peak current control to be implemented on Vpp and not on Vcc, then control logic can select the Vpp data structure. If peak current control is to be implemented on both Vcc and Vpp, then control logic can select both the second Vcc data structure and the Vpp data structure. In some embodiments, the plurality of current quantization data structures includes a time averaging window current quantization data structure defined for a time averaging window.

Each current quantization data structure of the plurality of current quantization data structures maintains, for each sub-operation of the set of sub-operations, a respective current quantization value reflecting an amount of current that is consumed by the respective sub-operation. Each current quantization data structure of the plurality of current quantization data structures can further maintain, for each sub-operation of the set of sub-operations, a respective breakpoint characteristic indicative of a type of breakpoint transition. For example, each breakpoint characteristic can be indicative of one of: a low current (LC) breakpoint to high current (HC) breakpoint transition, an HC breakpoint to LC breakpoint transition, or no breakpoint transition.

At operation 850, the memory access operation is performed. For example, control logic can cause the memory access operation to be performed using the current quantization data structure. For example, control logic can use the current quantization data structure to, for each sub-operation, determine a maximum amount of current that can be needed to execute the sub-operation (i.e., from the Q-value), and determine whether any additional current needs to be reserved (in addition to the current reserved from the previous sub-operation) before executing the sub-operation (i.e., from the breakpoint characteristic). Further details regarding operations 810-860 are described above with reference to FIGS. 1A-7.

Figure 9:
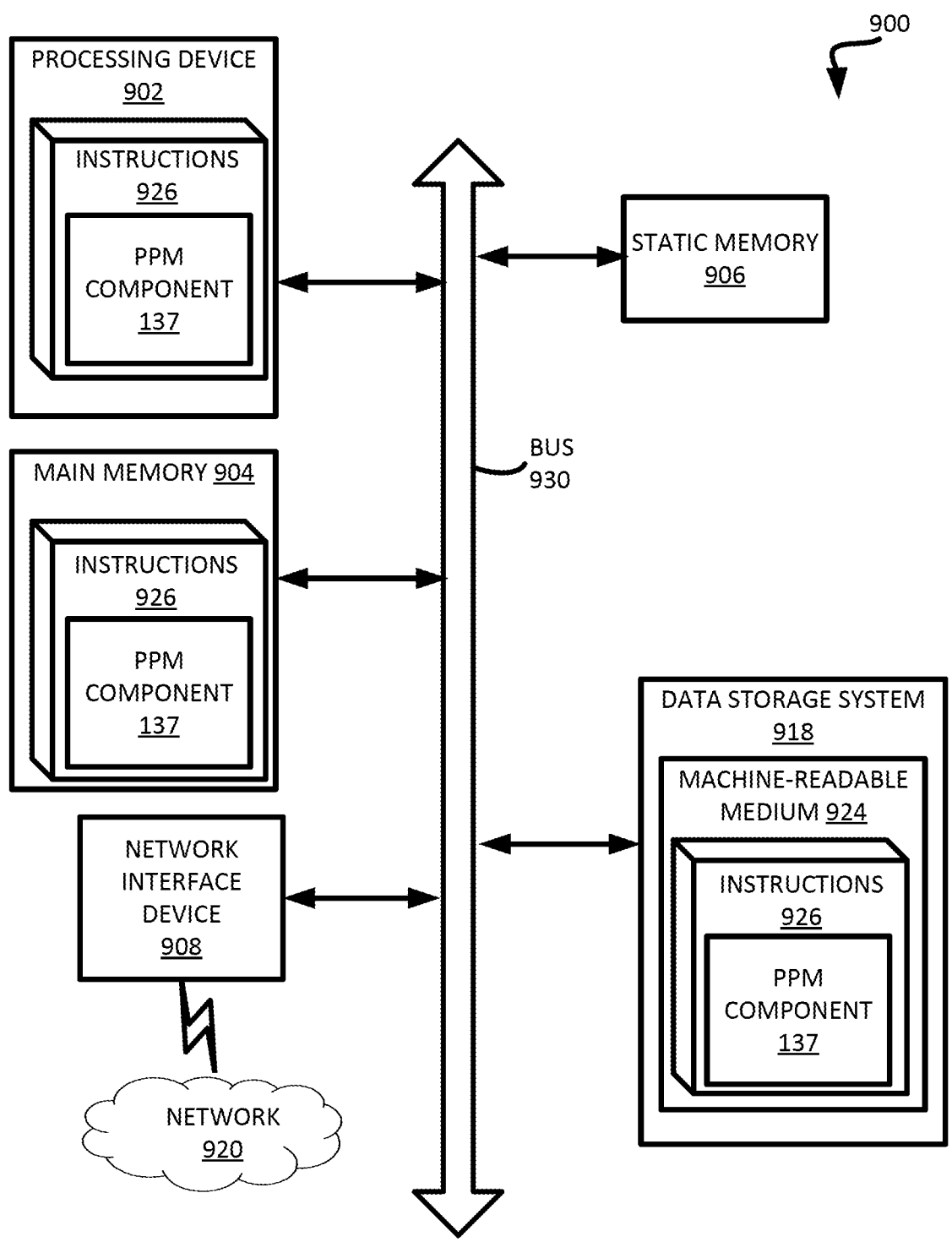
FIG. 9 is a block diagram of an example computer system in which embodiments of the present disclosure may operate.

FIG. 9 illustrates an example machine of a computer system 900 within which a set of instructions, for causing the machine to perform any one or more of the methodologies discussed herein, can be executed. In some embodiments, the computer system 900 can correspond to a host system (e.g., the host system 120 of FIG. 1A) that includes, is coupled to, or utilizes a memory sub-system (e.g., the memory sub-system 110 of FIG. 1A) or can be used to perform the operations of a controller (e.g., to execute an operating system to perform operations corresponding to the local media controller 135 and/or the PPM component 137 of FIG. 1A). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a memory cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 900 includes a processing device 902, a main memory 904 (e.g., read-only memory (ROM), flash memory, dynamic random access memory (DRAM) such as synchronous DRAM (SDRAM) or RDRAM, etc.), a static memory 906 (e.g., flash memory, static random access memory (SRAM), etc.), and a data storage system 918, which communicate with each other via a bus 930.

Processing device 902 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 902 can also be one or more special-purpose processing devices such as an application specific integrated circuit (ASIC), a field programmable gate array (FPGA), a digital signal processor (DSP), network processor, or the like. The processing device 902 is configured to execute instructions 926 for performing the operations and steps discussed herein. The computer system 900 can further include a network interface device 908 to communicate over the network 920.

The data storage system 918 can include a machine-readable storage medium 924 (also known as a computer-readable medium) on which is stored one or more sets of instructions 926 or software embodying any one or more of the methodologies or functions described herein. The instructions 926 can also reside, completely or at least partially, within the main memory 904 and/or within the processing device 902 during execution thereof by the computer system 900, the main memory 904 and the processing device 902 also constituting machine-readable storage media. The machine-readable storage medium 924, data storage system 918, and/or main memory 904 can correspond to the memory sub-system 110 of FIG. 1A.

In one embodiment, the instructions 926 include instructions to implement functionality corresponding to a local media controller and/or PPM component (e.g., the local media controller 135 and/or the PPM component 137 of FIG. 1A). While the machine-readable storage medium 924 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A memory device comprising:
   a plurality of memory dies, each memory die of the plurality of memory dies comprising;
   a memory array; and
   control logic, operatively coupled with the memory array, to perform operations comprising:
      receiving a request to perform a memory access operation, wherein the memory access operation comprises a set of sub-operations;
      selecting a current quantization data structure from a plurality of current quantization data structures, wherein each current quantization data structure of the plurality of current quantization data structures maintains, for each sub-operation of the set of sub-operations, a respective current quantization value reflecting an amount of current that is consumed by the sub-operation based on a set of peak power management (PPM) operation parameters; and
      causing the memory access operation to be performed using PPM based on the current quantization data structure.

2. The memory device of claim 1, wherein the operations further comprise:
   determining whether to use PPM to perform the memory access operation; and
   in response to determining that PPM is to be used to perform the memory access operation, selecting the current quantization data structure.

3. The memory device of claim 1, wherein the plurality of current quantization data structures comprises a PPM operating mode current quantization data structure defined for a respective PPM operating mode indicative of whether a pump supply voltage rail is enabled.

4. The memory device of claim 1, wherein the plurality of current quantization data structures comprises a time averaging window current quantization data structure defined for a respective time averaging window.

5. The memory device of claim 1, wherein selecting the current quantization data structure comprises receiving a command selecting the current quantization data structure.

6. The memory device of claim 1, wherein each current quantization data structure of the plurality of current quantization data structures further maintains, for each sub-operation of the set of sub-operations, a respective breakpoint characteristic indicative of a type of breakpoint transition.

7. The memory device of claim 6, wherein each breakpoint characteristic is indicative of one of: a low current (LC) breakpoint to high current (HC) breakpoint transition, an HC breakpoint to LC breakpoint transition, or no breakpoint transition.

8. A method comprising:
   receiving, by a processing device, a request to perform a memory access operation, wherein the memory access operation comprises a set of sub-operations;
   selecting, by the processing device, a current quantization data structure from a plurality of current quantization data structures, wherein each current quantization data structure of the plurality of current quantization data structures maintains, for each sub-operation of the set of sub-operations, a respective current quantization value reflecting an amount of current that is consumed by the sub-operation based on a set of peak power management (PPM) operation parameters; and
   causing, by the processing device, the memory access operation to be performed using PPM based on the current quantization data structure.

9. The method of claim 8, further comprising:
   determining, by the processing device, whether to use PPM to perform the memory access operation in view of the set of PPM parameters; and
   in response to determining that PPM is to be used to perform the memory access operation, selecting, by the processing device, the current quantization data structure.

10. The method of claim 8, wherein the plurality of current quantization data structures comprises a PPM operating mode current quantization data structure defined for a respective PPM operating mode indicative of whether a pump supply voltage rail is enabled.

11. The method of claim 8, wherein the plurality of current quantization data structures comprises a time averaging window current quantization data structure defined for a respective time averaging window.

12. The method of claim 8, wherein selecting the current quantization data structure comprises receiving a command selecting the current quantization data structure.

13. The method of claim 8, wherein each current quantization data structure of the plurality of current quantization data structures further maintains, for each sub-operation of the set of sub-operations, a respective breakpoint characteristic indicative of a type of breakpoint transition.

14. The method of claim 13, wherein each breakpoint characteristic is indicative of one of: a low current (LC) breakpoint to high current (HC) breakpoint transition, an HC breakpoint to LC breakpoint transition, or no breakpoint transition.

15. A non-transitory computer-readable storage medium comprising instructions that, when executed by a processing device, cause the processing device to perform operations comprising:

receiving a request to perform a memory access operation comprising a set of sub-operations;

determining whether to use peak power management (PPM) to perform the memory access operation;

in response to determining that PPM is to be used to perform the memory access operation, selecting a current quantization data structure from a plurality of current quantization data structures, wherein each current quantization data structure of the plurality of current quantization data structures maintains, for each sub-operation of the set of sub-operations, a respective current quantization value reflecting an amount of current that is consumed by the sub-operation based on a set of PPM operation parameters; and causing the memory access operation to be performed using PPM based on the current quantization data structure.

16. The non-transitory computer-readable storage medium of claim 15, wherein the plurality of current quantization data structures comprises a PPM operating mode current quantization data structure defined for a respective PPM operating mode indicative of whether a pump supply voltage rail is enabled.

17. The non-transitory computer-readable storage medium of claim 15, wherein the plurality of current quantization data structures comprises a time averaging window current quantization data structure defined for a respective time averaging window.

18. The non-transitory computer-readable storage medium of claim 15, wherein selecting the current quantization data structure comprises receiving a command selecting the current quantization data structure.

19. The non-transitory computer-readable storage medium of claim 15, wherein each current quantization data structure of the plurality of current quantization data structures further maintains, for each sub-operation of the set of sub-operations, a respective breakpoint characteristic indicative of a type of breakpoint transition.

20. The non-transitory computer-readable storage medium of claim 19, wherein each breakpoint characteristic is indicative of one of: a low current (LC) breakpoint to high current (HC) breakpoint transition, an HC breakpoint to LC breakpoint transition, or no breakpoint transition.

* * * * *